(12) United States Patent
Paiton et al.

(10) Patent No.: US 9,477,901 B2
(45) Date of Patent: Oct. 25, 2016

(54) OBJECT DETECTION APPROACH USING GENERATIVE SPARSE, HIERARCHICAL NETWORKS WITH TOP-DOWN AND LATERAL CONNECTIONS FOR COMBINING TEXTURE/COLOR DETECTION AND SHAPE/CONTOUR DETECTION

(71) Applicant: Los Alamos National Security, LLC, Los Alamos, NM (US)

(72) Inventors: Dylan M. Paiton, Rio Rancho, NM (US); Garrett T. Kenyon, Santa Fe, NM (US); Steven P. Brumby, Santa Fe, NM (US); Peter F. Schultz, Los Alamos, NM (US); John S. George, White Rock, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 0 days.

(21) Appl. No.: 14/805,540

(22) Filed: Jul. 22, 2015

(65) Prior Publication Data

US 2015/0325007 A1    Nov. 12, 2015

Related U.S. Application Data

(63) Continuation of application No. 14/026,812, filed on Sep. 13, 2013, now Pat. No. 9,092,692, which is a
(Continued)

(51) Int. Cl.
*G06K 9/00* (2006.01)
*G06K 9/62* (2006.01)
(Continued)

(52) U.S. Cl.
CPC ........... *G06K 9/4604* (2013.01); *G06K 9/4619* (2013.01); *G06K 9/4652* (2013.01);
(Continued)

(58) Field of Classification Search
CPC ............ G06K 9/4604; G06K 9/4619; G06K 9/4652; G06K 9/00476; G06K 9/6218; G06K 9/6256; G06K 9/6267; G06T 2207/10024; G06T 7/0051; G06T 7/0079; G06T 7/20; G06T 7/40; G06T 7/408
USPC ................................ 382/113, 155, 159, 162
See application file for complete search history.

(56) References Cited

U.S. PATENT DOCUMENTS

| 5,311,601 A * | 5/1994 | Carpenter ............ G06N 3/0409 382/158 |
| 6,100,899 A | 8/2000 | Ameline et al. |

(Continued)

OTHER PUBLICATIONS

A.M. Waxman, J.G. Verly, D.A. Fay, F. Liu, M.I. Braun, B. Pugliese, W. Ross, and W. Streilein, "A prototype system for 3D color fusion and mining of multisensor/spectral imagery", 4th International Conference on Information Fusion, Montreal, 2001.
(Continued)

*Primary Examiner* — Kanjibhai Patel
(74) *Attorney, Agent, or Firm* — LeonardPatel PC

(57) ABSTRACT

An approach to detecting objects in an image dataset may combine texture/color detection, shape/contour detection, and/or motion detection using sparse, generative, hierarchical models with lateral and top-down connections. A first independent representation of objects in an image dataset may be produced using a color/texture detection algorithm. A second independent representation of objects in the image dataset may be produced using a shape/contour detection algorithm. A third independent representation of objects in the image dataset may be produced using a motion detection algorithm. The first, second, and third independent representations may then be combined into a single coherent output using a combinatorial algorithm.

19 Claims, 20 Drawing Sheets

Related U.S. Application Data continuation of application No. 14/026,295, filed on Sep. 13, 2013, now Pat. No. 9,152,881, and a continuation of application No. 14/026,730, filed on Sep. 13, 2013, now Pat. No. 9,152,888.

(60) Provisional application No. 61/700,748, filed on Sep. 13, 2012.

(51) Int. Cl.
*G06K 9/46* (2006.01)
*G06T 7/00* (2006.01)
*G06T 7/20* (2006.01)
*G06T 7/40* (2006.01)

(52) U.S. Cl.
CPC ............ *G06K 9/629* (2013.01); *G06T 7/0051* (2013.01); *G06T 7/0079* (2013.01); *G06T 7/20* (2013.01); *G06T 7/40* (2013.01); *G06T 2207/10024* (2013.01)

(56) References Cited

U.S. PATENT DOCUMENTS

| | | | |
|---|---|---|---|
| 7,058,128 B1 | 6/2006 | Itokawa | |
| 7,349,728 B2* | 3/2008 | Corchs | G06F 19/3437 600/410 |
| 7,542,959 B2 | 6/2009 | Barnhill et al. | |
| 7,734,097 B1 | 6/2010 | Porikli et al. | |
| 8,488,877 B1* | 7/2013 | Owechko | G06K 9/00704 382/103 |
| 8,768,048 B1 | 7/2014 | Kwatra et al. | |
| 9,015,093 B1* | 4/2015 | Commons | G01C 21/3602 701/23 |
| 9,155,489 B2* | 10/2015 | Zelinsky | A61B 5/0042 |
| 2004/0161133 A1 | 8/2004 | Elazar et al. | |
| 2004/0252882 A1 | 12/2004 | Krumm et al. | |
| 2007/0098222 A1 | 5/2007 | Porter et al. | |
| 2008/0170623 A1 | 7/2008 | Aharon et al. | |
| 2010/0040296 A1 | 2/2010 | Ma et al. | |
| 2010/0128942 A1 | 5/2010 | Licato et al. | |
| 2011/0064302 A1 | 3/2011 | Ma et al. | |
| 2011/0075920 A1 | 3/2011 | Wu et al. | |
| 2011/0075938 A1 | 3/2011 | Singhal | |
| 2011/0188757 A1 | 8/2011 | Chan et al. | |
| 2011/0243434 A1 | 10/2011 | Cao | |
| 2012/0269436 A1 | 10/2012 | Mensink et al. | |

OTHER PUBLICATIONS

Brophy, A. L. "Alternatives to a table of criterion values in signal detection theory". Behavior Research Methods, Instruments, & Computers, 18, 285-286 (1986).

C. Cortes & V. Vapnik, "Support-Vector Networks", Machine Learning, 20, 273-297 (1995).

Carpenter, G. A., Gjaja, M. N., Gopal, S., & Woodcock, C. E. "ART neural networks for remote sensing: vegetation classification from Landsat TM and terrain data". IEEE Transactions on Geoscience and Remote Sensing, 35, 308-325 (1997).

Chang, C.C. and C.J. Lin. "LIBSVM—A Library for Support Vector Machines," (2001). Available: http://www.csie.ntu.edu.tw/~cjlin/libsvm.

D. G. Lowe, "Object recognition from local scale-invariant features," Proceedings of the International Conference on Computer Vision, 1999.

D. L. Donoho and M. Elad, "Optimally sparse representation in general (nonorthogonal) dictionaries via L1 minimization", Proc. National Academy of Sciences, 100, pp. 2197-2202 (2003).

Daniela I. Moody, Steven P. Brumby, Kary L. Myers, Norma H. Pawley, "Classification of transient signals using sparse representations over adaptive dictionaries", Proceeding of SPIE vol. 8058, Orlando, FL, Apr. 25-29, 2011.

First set of IEEE Xplore search results in U.S. Appl. No. 14/026,812 from http://ieeexplore.ieee.org/search/searchresult.jsp on Jan. 12, 2015 (complete query string not visible).

Hebb, D.O., "The organization of behavior", New York: Wiley, 1949.

Hubel, D.H., Wiesel, T.N. "Receptive fields and functional architecture of monkey striate cortex". J. Physiol. (Lond.) 195, 215-243 (1968).

Ian L. Lemieux, "Non-Final Office Action" issued on Mar. 30, 2015 for U.S. Appl. No. 14/026,295.

Ian L. Lemieux, "Non-Final Office Action", issued on Feb. 25, 2015 for U.S. Appl. No. 14/026,730.

J. Mairal, F. Bach, and J. Ponce, "Task-driven dictionary learning," preprint, 2010. Printed in IEEE Transactions on Pattern Analysis and Machine Intelligence, vol. 34, No. 4, Apr. 2012.

J. Mairal, M. Elad and G. Sapiro. "Sparse representation for color image restoration". IEEE Transactions on Image Processing. vol. 17, issue 1, pp. 53-69 (Jan. 2008).

K. Fukushima, "Neocognitron: A self-organizing neural network model for a mechanism of pattern recognition unaffected by shift in position", Biological Cybernetics, 36(4), pp. 193-202 (Apr. 1980).

Kanjibhai B. Patel, "Notice of Allowance" issued on May 29, 2015 for U.S. Appl. No. 14/026,812.

L. Itti, C. Koch, E. Niebur, "A Model of Saliency-Based Visual Attention for Rapid Scene Analysis", IEEE Transactions on Pattern Analysis and Machine Intelligence, vol. 20, No. 11, pp. 1254-1259 (Nov. 1998).

M. Chiarella, D. Fay, R. Ivey, N. Bomberger, A. Waxman, "Multisensor image fusion, mining, and reasoning: Rule sets for higher-level AFE in a COTS environment", Proceedings of the 7th International Conference on Information Fusion, Stockholm, Sweden, pp. 983-990 (Jun. 2004).

Masquelier T, Serre T, Thorpe SJ and Poggio T., "Learning complex cell invariance from natural videos: a plausibility proof." CBCL Paper #269/MIT-CSAIL-TR #2007-060, MIT, Cambridge, MA, 2007.

Non-final Office Action issued in U.S. Appl. No. 14/026,812 on Jan. 12, 2015.

Notice of Allowance issued in U.S. Appl. No. 14/026,730 on Jul. 21, 2015.

Notice of Allowance issued in U.S. Appl. No. 14/026,812 on May 29, 2015.

Oja, Erkki, "A simplified neuron model as a principal component analyzer", Journal of Mathematical Biology 15 (3): 267-273 (Nov. 1982).

Olshausen, B. A. and Field, D. J., "Emergence of simple-cell receptive field properties by learning a sparse code for natural images". Nature, 381:607-609 (1996).

Paul Henning and Andrew White, "Trailblazing with Roadrunner", Computing in Science & Engineering, pp. 91-95 (Jul./Aug. 2009).

R. DeValois, D. Albrecht, and L. Thorell, "Spatial Frequency Selectivity of Cells in Macaque Visual Cortex", Vision Research, vol. 22, pp. 545-559 (1982).

R. DeValois, E. Yund, and N. Hepler, "The Orientation and Direction Selectivity of Cells in Macaque Visual Cortex", Vision Research, vol. 22, pp. 531-544 (1982).

Riesenhuber, M. & Poggio, T. "Hierarchical Models of Object Recognition in Cortex", Nature Neuroscience 2 (1999).

S. G. Mallat and Z. Zhang, "Matching Pursuits with Time-Frequency Dictionaries", IEEE Transactions on Signal Processing, pp. 3397-3415 (Dec. 1993).

Second set of IEEE Xplore search results in U.S. Appl. No. 14/026,812 from http://ieeexplore.ieee.org/search/searchresult.jsp on Jan. 12, 2015 (complete query string not visible).

Steven Brumby, Luis Bettencourt, Michael Ham, Ryan Bennett, and Garrett Kenyon, "Quantifying the difficulty of object recognition tasks via scaling of accuracy versus training set size", Computational and Systems Neuroscience (COSYNE) 2010, Salt Lake City, Utah, Feb. 25-28, 2010.

(56) References Cited

OTHER PUBLICATIONS

Steven Brumby, Michael Ham, Will A. Landecker, Garrett Kenyon, Luis Bettencourt, "Visualizing classification of natural video sequences using sparse, hierarchical models of cortex", Computational and Systems Neuroscience (COSYNE) 2011, Salt Lake City, Utah, Feb. 24-27, 2011. [Nature Precedings, npre.2011.5971.1].

Steven P. Brumby, Amy E. Galbraith, Michael Ham, Garrett Kenyon, and John S. George, "Visual Cortex on a Chip: Large-scale, real-time functional models of mammalian visual cortex on a GPGPU", GPU Technology Conference (GTC) 2010, San Jose, CA, Sep. 20-23, 2010.

Steven P. Brumby, Garrett Kenyon, Will Landecker, Craig Rasmussen, Sriram Swaminarayan, and Luis M. A. Bettencourt, "Large-scale functional models of visual cortex for remote sensing", 38th IEEE Applied Imagery Pattern Recognition, Vision: Humans, Animals, and Machines, Cosmos Club, Washington DC Oct. 14-16, 2009.

T. Serre, A. Oliva and T. Poggio. "A feedforward architecture accounts for rapid categorization". Proceedings of the National Academy of Science, 104(15), pp. 6424-6429 (Apr. 2007).

T. Serre, L. Wolf, S. Bileschi, M. Riesenhuber and T. Poggio. "Object recognition with cortex-like mechanisms". IEEE Transactions on Pattern Analysis and Machine Intelligence, 29(3), pp. 411-426 (2007).

USGS Hyperion Sensors Site, http://eo1.usgs.gov/sensors/hyperion, last modified Dec. 13, 2011 (last accessed Jan. 24, 2014).

W.S. Geisler, J.S. Perry "Contour statistics in natural images: grouping across occlusions" Vis. Neurosci., 26 (1), pp. 109-121 (2009).

* cited by examiner

200
FIG. 2
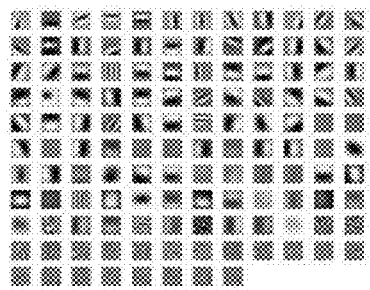
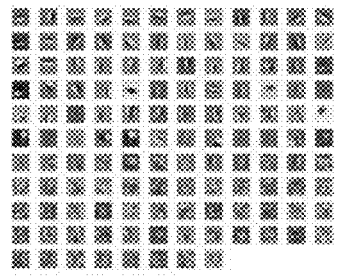
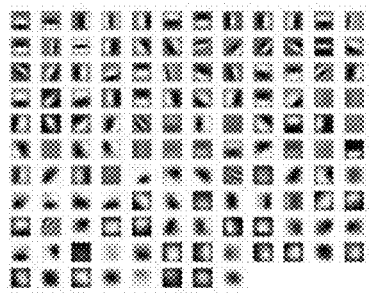
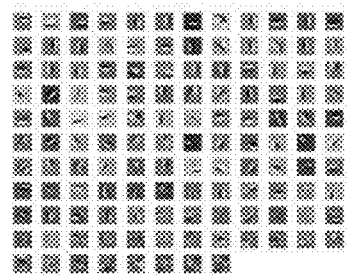
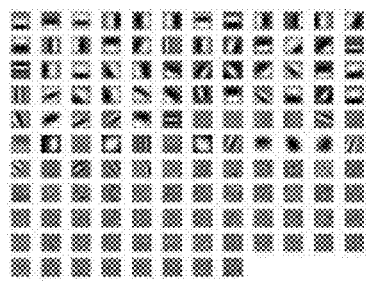
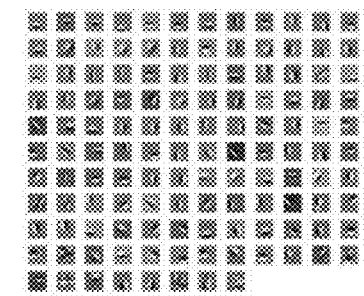

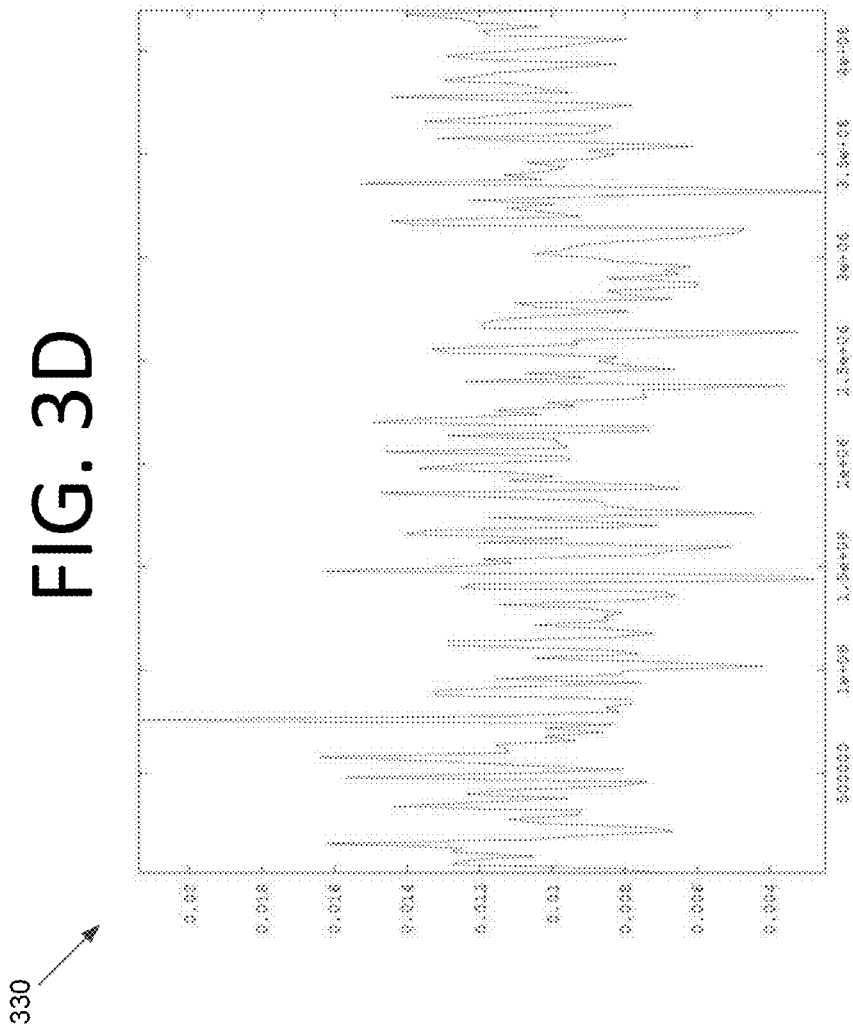

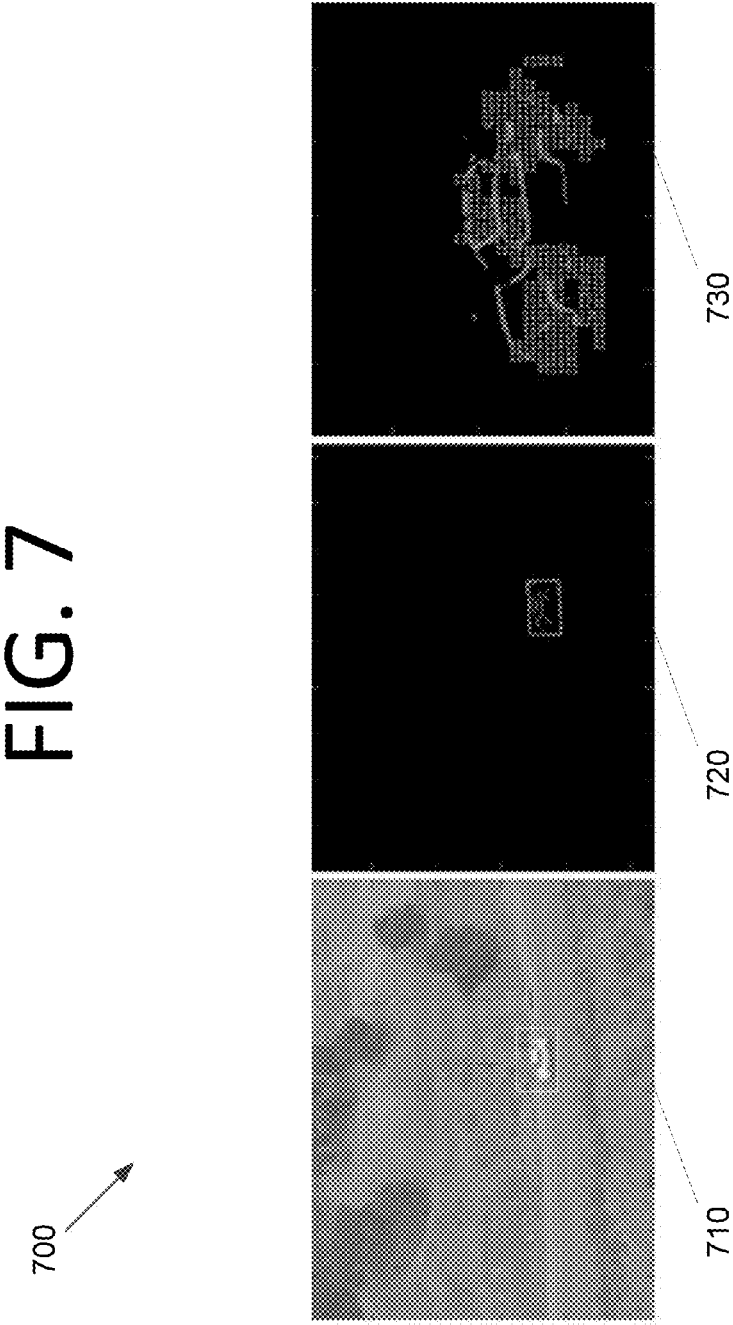

OBJECT DETECTION APPROACH USING GENERATIVE SPARSE, HIERARCHICAL NETWORKS WITH TOP-DOWN AND LATERAL CONNECTIONS FOR COMBINING TEXTURE/COLOR DETECTION AND SHAPE/CONTOUR DETECTION

CROSS REFERENCE TO RELATED APPLICATIONS

This application is a continuation of U.S. patent application Ser. No. 14/026,812 filed on Sep. 13, 2013, which is a continuation-in-part of U.S. patent application Ser. Nos. 14/026,295 and 14/026,730, both filed on Sep. 13, 2013, and further claims the benefit of U.S. Provisional Application Ser. No. 61/700,748, filed on Sep. 13, 2012. The subject matter of these earlier filed applications is hereby incorporated by reference in its entirety.

STATEMENT OF FEDERAL RIGHTS

The United States government has rights in this invention pursuant to Contract No. DE-AC52-06NA25396 between the United States Department of Energy and Los Alamos National Security, LLC for the operation of Los Alamos National Laboratory.

FIELD

The present invention generally relates to machine vision, and, more particularly, to an approach to detecting objects in an image dataset that combines color/texture detection, shape/contour detection, and/or motion detection using sparse, generative, hierarchical models with lateral and top-down connections.

BACKGROUND

It is generally desirable for machine vision applications to be as accurate as possible while operating within reasonable computational constraints. Conventional systems generally rely on color/texture analyses that require targets objects to possess one or more highly distinctive, local features that can be used as distinguishing characteristics for a classification algorithm. Many objects, however, consist of materials that are widely prevalent across a wide variety of object categories. Much less effort has been made to characterize objects based on shape, or the particular way the component features are arranged relative to one another in two-dimensional (2D) image space. Accordingly, applying an approach that characterizes objects based on shape/contour may be beneficial. Moreover, less effort still has been made to characterize objects based on their motion properties, such as velocity. Applying an approach that characterizes objects based on perceived motion may also be beneficial. Furthermore, applying a single approach that characterizes objects using one or all of the three of the aforementioned methods may be beneficial.

It has been shown that hierarchical, or deep, models for solving computer vision problems are more generally advantageous than traditional flat architectures. Nearly all existing hierarchical approaches to computer vision are exclusively bottom-up or feed-forward in character. In such models, information flows in only one direction and each subsequent layer can be trained only after the previous layers have been completely learned. A fundamental disadvantage of this exclusively bottom-up or feed-forward approach is that the features that have been previously learned by a given layer in the hierarchy cannot be modified to take into account what is subsequently learned by succeeding layers. As a result, exclusively bottom-up/feed-forward networks contain a large amount of redundancy, with the same information being represented at each stage in the hierarchy. To reduce redundancy in the system, it may be preferable if instead, all of the layers in the hierarchy could be learned simultaneously in a competitive manner such that the information extracted by one layer was not redundant with any other layer, but rather encoded as unique information.

Another problem typically encountered in standard approaches to training hierarchical networks for solving computer vision tasks is that the dimensionality of underlying feature space will often increase from one layer to the next. This increase in dimensionality occurs because each subsequent layer in a hierarchical network receives convergent inputs from a spatial neighborhood of feature detectors located in the previous layer and because there are, in theory, a combinatorially large number of ways of combining spatially-distributed features. Thus the outputs of any given layer are typically of a higher dimensionality than its inputs. Spatial convergence is vital, however, for enabling hierarchical networks to learn feature detectors of increasing complexity and increasing viewpoint invariance at successively higher processing stages. Mathematically, hierarchical networks for solving computer vision tasks should, in general, need to contain progressively more neurons in each subsequent hierarchical layer in order to capture the increased dimensionality and complexity of their inputs. However, it is generally impractical to increase the size of each layer in a hierarchy ad infinitum, as the number of feature detectors in each subsequent layer would grow exponentially.

In a deep, hierarchical network, there is an incentive to introduce additional invariance at each subsequent layer. Traditionally, invariance is encoded into computer vision systems using a max or mean pooling operation, or some analogous procedure such as constructing a histogram of local activity levels. In this approach, layers are sub-divided into two sub-stages, a first stage including feature detectors that respond selectively to a particular pattern of inputs, and a second, typically smaller, stage of invariant detectors that pool over a small neighborhood of selective feature detectors in the first stage. Such pooling serves to reduce the dimensionality of the overall output of the layer and to introduce a small amount of additional invariance to local translations of the features or objects to be detected.

However, an approach based on max or mean pooling has been repeatedly shown to fail when scaling up from model datasets to real world problems. Additionally, max or mean pooling fails to account for any non-linear transformations that objects typically undergo, such as changes in viewpoint or shading. However, some mechanism for incrementally increasing invariance is desirable. A scalable, general scheme for incrementally increasing the invariance of the representations encoded at each layer in a visual processing hierarchy may be beneficial to the construction of computer vision systems for viewpoint invariant object detection.

Conventional computer vision solutions often perform color/texture analysis or shape/contour analysis. Traditionally, these solutions are viewed and compared independently. A composite approach that combines an improved shape/contour detection algorithm and an improved color/texture analysis algorithm may be more beneficial. Also, a single deep, sparse, hierarchical network that analyzes both color/texture and shape/contour features simultaneously may be desirable. Furthermore, conventional systems for solving computer vision problems generally require immense processing and memory resources. Accordingly, an approach that is amenable to hardware that requires less power to run while maintaining computational speed and accuracy may be beneficial.

SUMMARY

Certain embodiments of the present invention may provide solutions to the problems and needs in the art that have not yet been fully identified, appreciated, or solved by current object detection technologies. For example, a network that is generative, deep, sparse, and hierarchical could be used for shape/contour analysis, motion analysis, and/or color/texture analysis. Furthermore, such a network could be implemented to perform these types of analysis simultaneously. This network could be configured to combine some or all of the independent analysis of shape/contour, motion, and color/texture, or an appropriate combinatorial algorithm could be used to combine the independent outputs of the network.

To learn an entire hierarchy all at once in a competitive manner requires not only bottom-up, but also top-down connections, with the top-down connections implementing the competition between layers. A hierarchical network in which all layers could be trained simultaneously in a competitive manner so as to reduce redundancy between layers may therefore be beneficial. Accordingly, some embodiments of the present invention use top-down connections to create competition between hierarchical processing levels. Such top-down competition leads to representations that are sparser and less redundant than would be the case if top-down competition were absent. It is expected that by virtue of being sparser and less redundant, the sparse, hierarchical representations generated in the presence of top-down competition will support superior performance on computer vision tasks, such as object identification tracking, than would be possible with other models that lack top-down competition.

A solution that augments the feed-forward, feature-based input from previous layers with a lower-dimensional pixel-based representation, or reconstruction, of the same input may be beneficial. In this solution, the subsequent layer could represent the pixel-based reconstruction using its own feature space that was of higher dimension than the pixel-based reconstruction itself, thereby capturing additional spatial complexity and thus potentially compensating for the difficulty of fully representing the high-dimensional feature-based inputs from the previous layer. Moreover, such a solution would allow subsequent layers to have approximately the same number of feature detectors as previous layers, while still representing greater complexity at each level. Such a solution could therefore be highly beneficial for constructing hierarchical networks for solving computer vision tasks such as viewpoint invariant object category detection.

Accordingly, some embodiments of the present invention use a combination of pixel-based and feature-based dictionaries in order to mitigate the combinatorial increase in the number of features that would otherwise be required at successive processing levels if only feature-based dictionaries were employed. Whereas the required size of feature-based dictionaries would be required to grow larger at each processing level due to the combinatorial number of additional patterns that can be created by combining different features across space, pixel-based dictionaries that can remain fixed in sized. In some embodiments, pixel-based dictionaries can be learned from reconstructed images generated by the sparse set of features that are active in the previous layer in response to a given image or video frame. In certain embodiments, the reconstructed image generated by the sparse set of features with non-zero activity may be down-sampled so that the required size of the pixel-based dictionaries remains constant at each processing layer in the hierarchical network. In some embodiments, the introduction of pixel-based dictionaries abets and improves the learning of feature-based dictionaries. In these and some other embodiments, having pixel-based dictionaries means the feature-based dictionaries need not be overcomplete. In other words, they have the ability to represent all combinations of the given feature-based inputs. Therefore, the non-overcomplete feature-based dictionaries would not grow at a combinatorial rate.

In order to achieve interlayer invariance to linear and non-linear transformations while maintaining scalability, it may be advantageous to impose lateral competition among the invariant feature detectors forming the second stage of processing within each layer. In particular, it may be advantageous if the selective feature detectors making up the first stage of processing within each layer would continue to function as in many existing hierarchical models, but an additional second stage of processing within each layer of approximately equal size and containing more invariant feature detectors would also be implemented. The second stage may receive local input at the same spatial location from the selective feature detectors in the first processing stage and, in addition, receive spatially convergent lateral input from a surrounding neighborhood of selective feature detectors. This may allow the responses of the selective feature detectors to be viewed in context with respect to the neighboring selective feature detectors, allowing for responses from the second processing stage that are invariant to affine transforms of the input object.

It may be desirable for such second stage, invariant feature detectors based on a combination of local and lateral inputs to be a more generalizable, scalable alternative to max or mean pooling. Additionally, it may be desirable for the invariant feature detectors to be based on local and lateral inputs, which generate the output for the layer that is visible to subsequent layers, to be significantly more stable in response to the small image transformations that occur between frames of a video sequence than the selective feature detectors that comprise the first stage of processing.

Accordingly, in some embodiments, a combination of local and lateral dictionaries can be used to implement a $2^{nd}$ stage of invariant feature detectors at each hierarchical processing level that are more invariant with respect to small image transformations, such as those that occur between successive video frames in a hand-held camera, than the more selective feature detectors at the $1^{st}$ stage that provide input to the $2^{nd}$ stage of invariant feature detectors. In some embodiments, local dictionaries can be used in a similar way to how pixel-based dictionaries are used above, namely, to reduce the effective dimensionality of the selective feature detectors to be represented at the $2^{nd}$ invariant stage of each hierarchal processing level. In certain embodiments, local dictionaries enable the learning of lateral dictionaries that encompass a 9×9 neighborhood of selective feature detectors, or any other desired neighborhood size. In these embodiments, the combination of local and lateral dictionaries leads to development of $2^{nd}$ stage invariant feature detectors that are several times more invariant to small image transformations than the more selective 1$^{st}$ stage feature detectors that provide their input. Some embodiments that combine local and lateral dictionaries represent an alternative to max pooling, which is currently the state-of-the-art for incrementally increasing viewpoint invariance. Unlike max pooling, an approach based on combining local and lateral dictionaries can be scaled to networks of any size and depth and, because the local and lateral dictionaries are learned from the data, such an approach can potentially account for a wider variety of small image transformations.

Some embodiments of the present invention combine one or more aspects of a shape/contour detection approach and a color/texture detection approach. Each individual approach may generate independent representations of image data, which may then be combined into a single coherent output using a clustering algorithm or any other suitable combinatorial algorithm or technique. In some embodiments, the independent representations may be generated and also combined using a deep, sparse, hierarchical network. In certain embodiments, motion detection may also be employed. As discussed herein, an image dataset may include images and/or video.

In one embodiment, a computer-implemented method includes producing, by a computing system, a first independent representation of objects in an image dataset using a color/texture detection algorithm. The computer-implemented method also includes producing, by the computing system, a second independent representation of objects in the image dataset using a shape/contour detection algorithm. The computer-implemented method further includes combining, by the computing system, the first and second independent representations into a single coherent output using a combinatorial algorithm.

In another embodiment, a computer program is embodied on a non-transitory computer-readable medium. The computer program is configured to cause at least one processor to produce a first independent representation of objects in an image dataset using a color/texture detection algorithm, produce a second independent representation of objects in the image dataset using a shape/contour detection algorithm, and produce a third independent representation of objects in the image dataset using a motion detection algorithm. The computer program is also configured to cause the at least one processor to combine the first, second, and third independent representations into a single coherent output using a combinatorial algorithm.

In yet another embodiment, an apparatus includes memory storing computer program instructions and at least one processor configured to execute the computer program instructions. The at least one processor is configured to combine a first independent representation of objects in an image dataset produced by a color/texture detection algorithm and a second independent representation of objects in the image dataset produced by a shape/contour detection algorithm into a single coherent output using a combinatorial algorithm.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 2 illustrates learned dictionaries of hierarchical features in a two-layer network with and without top-down competition or without either top-down competition or supporting pseudo-overcomplete pixel-based dictionaries, according to an embodiment of the present invention.

FIG. 3D is a graph illustrating average reconstruction error without top-down feedback, according to an embodiment of the present invention.

FIG. 7 illustrates images of examples of clustering algorithm output, according to an embodiment of the present invention.

DETAILED DESCRIPTION OF THE EMBODIMENTS

Figure 1:
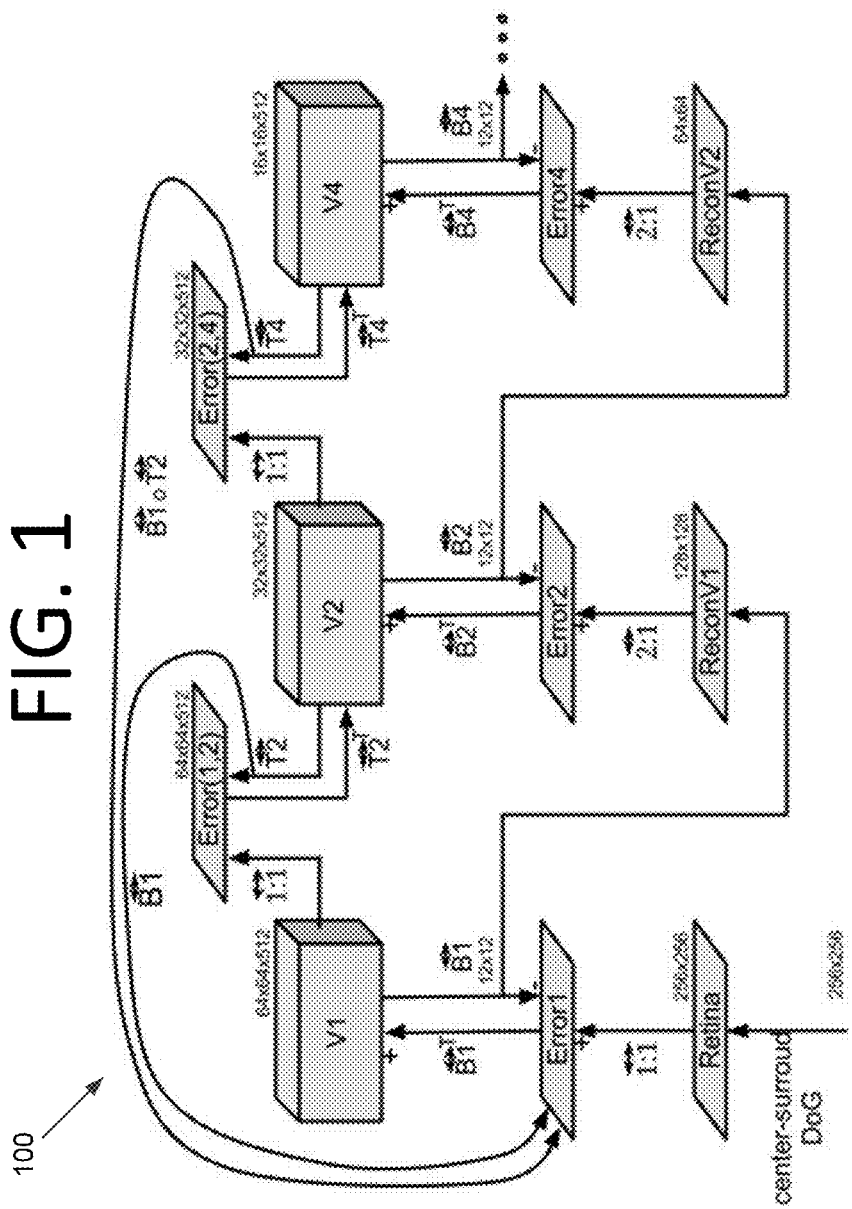
FIG. 1 illustrates a schematic of a sparse, generative model with top-down competition and combined pixel-based and feature-based dictionaries, according to an embodiment of the present invention.
Figure 3A:
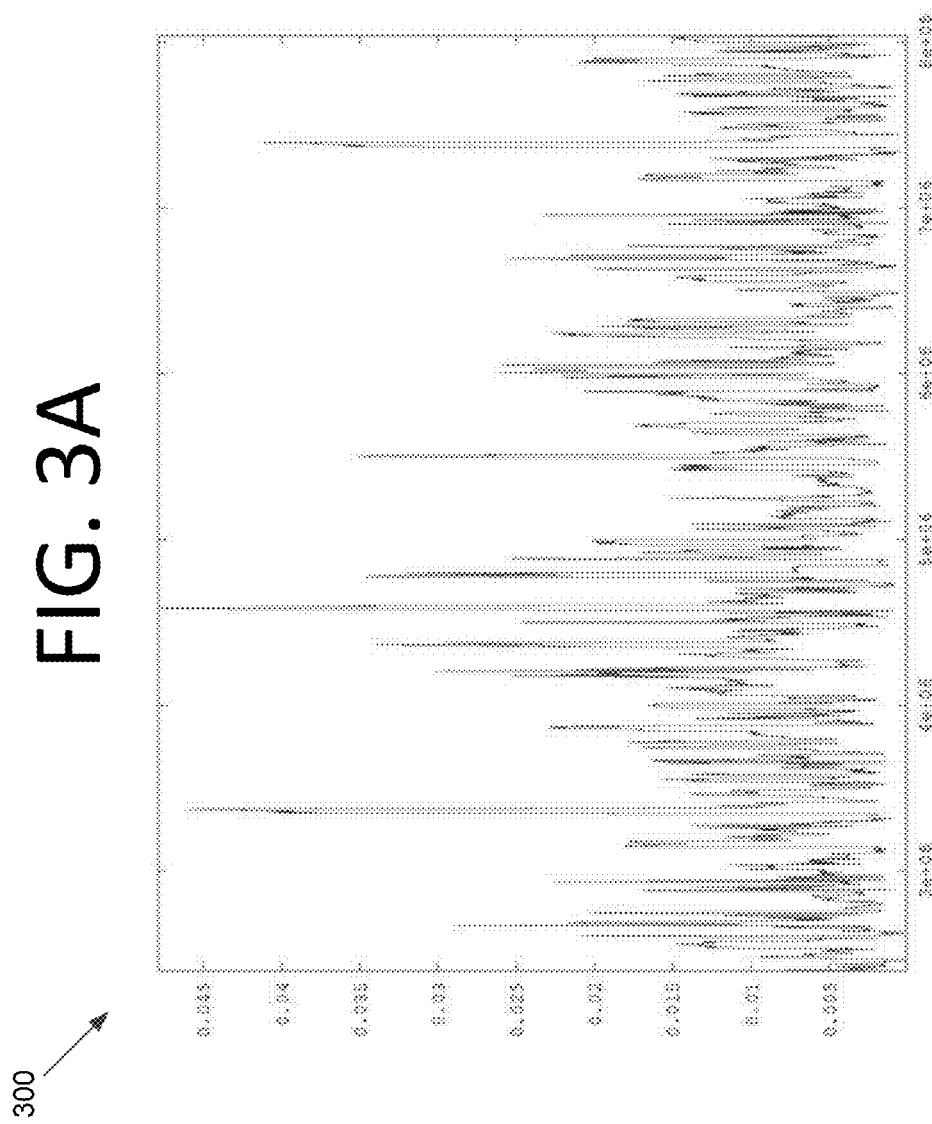
FIG. 3A is a graph illustrating the number of suprathreshold V2 neurons with non-zero activation, expressed as a percentage of the total number of dictionary elements when top-down feedback is present, according to an embodiment of the present invention.
Figure 3B:
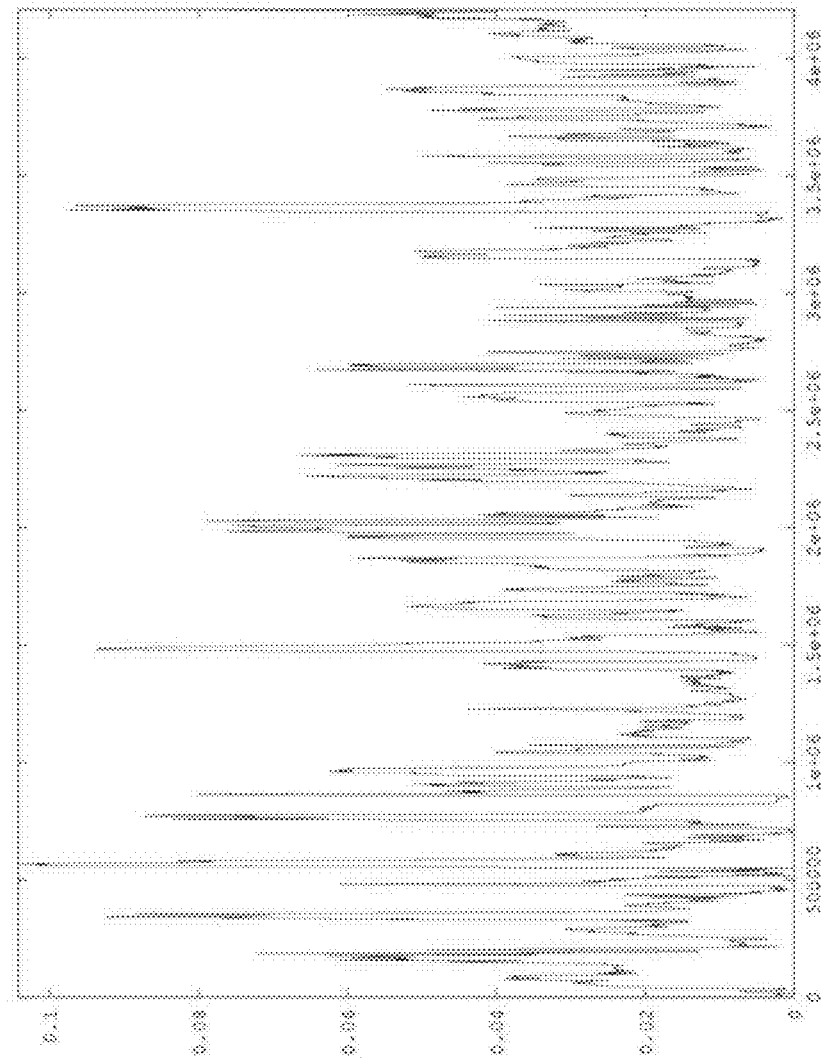
FIG. 3B is a graph illustrating the number of suprathreshold V2 neurons with non-zero activation, expressed as a percentage of the total number of dictionary elements when top-down feedback is absent, according to an embodiment of the present invention.
Figure 3C:
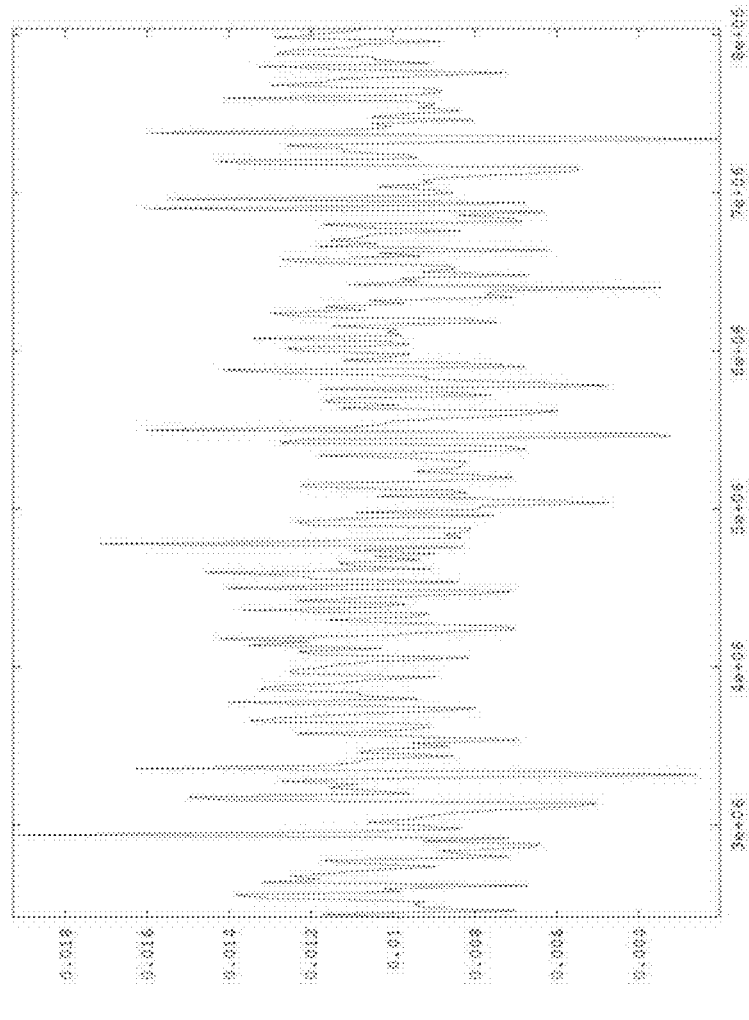
FIG. 3C is a graph illustrating average reconstruction error with top-down feedback, according to an embodiment of the present invention.

Some embodiments of the present invention pertain to an algorithm including a hierarchical network of computational layers for color/texture, shape/contour, and/or motion analysis. Certain embodiments may include top-down feedback from subsequent layers to previous layers that act to create competition between layers, reducing the redundancy and increasing the sparseness of the representations generated at each hierarchical processing level. Some embodiments may combine both pixel-based and feature-based dictionaries in order to reduce the effective dimensionality of the feature-based inputs, augmenting the learning of feature-based dictionaries. Certain embodiments may subdivide the layers into two stages, including a first stage of selective feature detectors and a second stage of invariant elements that may be implemented by combining local and lateral dictionaries.

Some embodiments of the present invention pertain to a combined approach to object detection and/or tracking in an image or video including independently evaluating texture/color cues, object shape/contour, and/or object motion cues using a hierarchical network with top-down feedback, a combination of pixel-based and feature-based dictionaries, and lateral competition to generate representations that are more invariant to small image transformations. This data may then be combined into a single coherent output using the network that generated the independent evaluations. This combined approach generally results in more accurate object detection than any individual approach alone.

Sparse, Generative Hierarchical Models with Top-Down Competition and Combined Pixel-Based and Feature-Based Dictionaries Hierarchically organized, sparse, generative models provide a powerful approach to learning the deep structure of the visual world from natural images or video. In conventional approaches, learning in hierarchical models is conducted in a bottom-up fashion, with the representations in each layer being trained only after the previous layer has been learned. Some embodiments of the present invention employ top-down feedback and a novel combination of pixel-based and feature-based dictionaries in order to learn an entire hierarchy of cortical representations simultaneously. In embodiments with top-down competition, a model neuron located in any given column and any given hierarchical layer may compete not only with other neurons in the same layer and column, as in many conventional hierarchical models, but also with neurons located in other hierarchical layers and in neighboring, overlapping columns.

The top-down competition may be configured to generate a global "brain-wide" sparse approximation of the original image or video frame that includes contributions from the entire hierarchy. In some embodiments, top-down competition between hierarchically-organized learned dictionaries leads to representations that are approximately three times more sparse, while supporting equivalent or slightly superior image reconstruction quality. Top-down competition reduces redundant encoding across hierarchical levels, allowing higher layers to encode lower spatial-frequency visual features while lower layers encode higher spatial-frequency details.

Some embodiments employ pseudo-overcomplete pixel-based dictionaries to help guide the acquisition of undercomplete feature-based dictionaries. In these embodiments, the first layer of dictionary elements may be trained on small image patches, whereas subsequent layers may be trained on a combination of direct feature-based inputs along with down-sampled, pixel-based inputs arising from the images generated by the previously layer's sparsely activated features. All dictionaries in these embodiments may be pseudo-overcomplete with respect to their pixel-based inputs, meaning that there are more neurons in each layer than there are pixel-based inputs, although weight sharing between columns imposes a constraint on the effective degree of overcompleteness.

In contrast, all dictionaries may be undercomplete with respect to their feature-based inputs. Training of the undercomplete feature-based dictionaries may be augmented by simultaneously training the pseudo-overcomplete pixel-based dictionaries. This may offer a functional interpretation of the prominent thalamic projections to non-striate cortical areas. It is reasonable to expect that top-down competition in combination with concatenated pixel-based and feature-based dictionaries leads to learned hierarchical representations that support improved performance on image classification tasks as compared to otherwise equivalent hierarchical representations that lack both top-down feedback and concatenated representations.

FIG. 1 depicts a schematic 100 of a sparse, generative model with top-down competition and combined pixel-based and feature-based dictionaries, according to an embodiment of the present invention. The error layer Error1 outputs the difference between each input image (or video frame) after Difference-of-Gaussians (DoG) filtering, represented by Retina, and the reconstructed image generated by all three hierarchical layers. The pixel-based error layers Error2 and Error4 output the difference between the image reconstructions generated by sparse V1 and V2 activity and the reconstructions generated by sparse V2 and V4 activity using the pseudo-overcomplete connectivity matrices B2 and B4, respectively.

The feature-based error layers Error(1,2) and Error(2,4) compare direct bottom-up input from V1 and V2 with sparse representations generated via the undercomplete connectivity matrices T2 and T4, respectively. The pseudo-overcomplete matrices B2 and B4 are thus used to help guide the learning of the undercomplete matrices T2 and T4. All connectivity matrices are adjusted after a sparse approximation has been generated for each video frame so as to minimize the corresponding reconstruction errors. The first error layer Error1 combines top-down feedback from V1, V2, and V4 via the composition of connectivity matrices $B1*V1$, $B1*T2*V2$ and $B1*T2*T4*V4$, respectively, introducing competition between hierarchical levels that reduces redundant encoding. A self-interaction (not depicted) ensures that V1, V2, and V4 activity remains constant when the total input from their presynaptic error layers is zero. Image dimensions are for relative comparison of layer dimensions and are not meant to exactly model any particular implementation.

FIG. 2 depicts hierarchically-organized dictionaries 200 trained in the presence of top-down competition and with support from a simultaneously learned pixel-based dictionary (top row), compared with the same pair of dictionaries trained in the absence of top-down competition (middle row), and also compared with the same pair of dictionaries in which both top-down competition and the supporting pixel-based dictionary have been omitted. Pixel-based B1 (left column) and feature-based T2 (right column) dictionaries are plotted for all 128 elements in order of activation frequency, with top-down competition (B1*T2*V2) and the pseudo-overcomplete pixel-based dictionary (B2) present (top row), with top-down competition removed (middle row), or with the concatenated pixel-based dictionary removed as well (bottom row). B1 dictionary elements (left column) span a 12×12 patch of image pixels, B2 dictionary elements (not shown) span a 12×12 patch of reconstructed and down-sampled pixels corresponding to a visual field of 24×24 pixels, and T2 dictionary elements (right column) span a 4×4 patch of V1 neurons corresponding to the same visual field of 24×24 image pixels.

With top-down feedback present, V1 neurons preferentially respond to high-frequency visual features (top row, left column). Without top-down competition, V1 neurons are relatively more responsive to low-frequency visual features (top row, left column). This observation supports the conjecture that top-down competition reduces redundant coding between hierarchical layers. A clear difference can be seen in the T2 dictionary elements depending on whether the T2 dictionary is supported by a pseudo-overcomplete pixel-based dictionary B2. With B2 absent, T2 dictionary elements are smaller, implying that they spatially integrate fewer V1 neurons into novel features (bottom row, right column). This observation supports the conjecture that the pseudo-overcomplete pixel-based dictionary B2 helps to constrain and guide the learning of the undercomplete feature-based dictionary T2.

Graphs 300, 310, 320, 330 of FIGS. 3A-D depict the effects of top-down feedback on the degree of sparsity given by the fraction of neurons that have non-zero activation as a function of frame number over the course of a long video sequence (~20,000 frames). The number of suprathreshold V2 neurons with non-zero activation, expressed as a percentage of the total number of dictionary elements, is approximately a factor of 3 lower (mean 0.8% vs. 2.4%) when top-down feedback is present (graph 300) than when top-down feedback is absent (graph 310). In contrast, the average total image reconstruction error is approximately the same (mean 0.0099 vs. 0.0097) with and without top-down feedback (graph 320 vs. graph 330, respectively). Thus, in some embodiments, top-down competition leads to much sparser representations without sacrificing image reconstruction quality.

A General, Scalable Method for Learning a 2nd Stage of Invariant Feature Detectors Using Local and Lateral Connections for Combining 1st Stage Selective Feature Detectors In the primary visual cortex, the responses of complex cells in layers II-III exhibit greater invariance to small image transformations than do the responses of simple cells in layer IV. In many models, complex cells acquire their additional invariance by pooling the outputs of simulated simple cells with overlapping receptive fields that respond to similar orientations and spatial frequencies, but are selective for different phases. Anatomically, however, layer II-III V1 cells make extensive long-range lateral synaptic connections whose contribution to response invariance remains largely unexplored.

In some embodiments, sparse approximation techniques based on a locally competitive algorithm (LCA) are used to learn long-range lateral pooling patterns from a series of video clips. The two cortical layers in the model consist of columns of translationally-invariant S1 and C1 cells, analogous to V1 simple (layer IV) and complex (layer II/III) cells, respectively. Sparseness is enforced by lateral inhibition in combination with a hard firing threshold. The S1 cells with suprathreshold (non-zero) activations are used to generate sparse approximations of each video frame. The connection weights to the active S1 cells are then adjusted via an online Hebbian learning rule that reduces the mean squared error between the reconstructed video frame and the original video frame. Model C1 cells derive 50% of their input from S1 cells in the same column and 50% of their input from S1 cells in the surrounding columns. Both the local and long-range C1 cell receptive fields are learned by minimizing the mean squared error between the actual and reconstructed local and surrounding S1 activities, respectively.

Results indicate that the responses of C1 cells with long range connections can be invariant by a factor or two or more to small image transformations produced by camera jitter, self-motion, and object motion than S1 inputs. These C1 cell responses may also exhibit similar increases in invariance to the phase of grating stimuli, implying a novel role for the extensive lateral connections in layers II-III of the primary visual cortex between putative complex cells. It is reasonable to expect that laterally connected C1 cells whose receptive fields are learned via sparse approximation techniques will support similar accuracy on viewpoint-invariant object detection tasks to C1 cells constructed using a more conventional max pooling operation.

Figure 4:
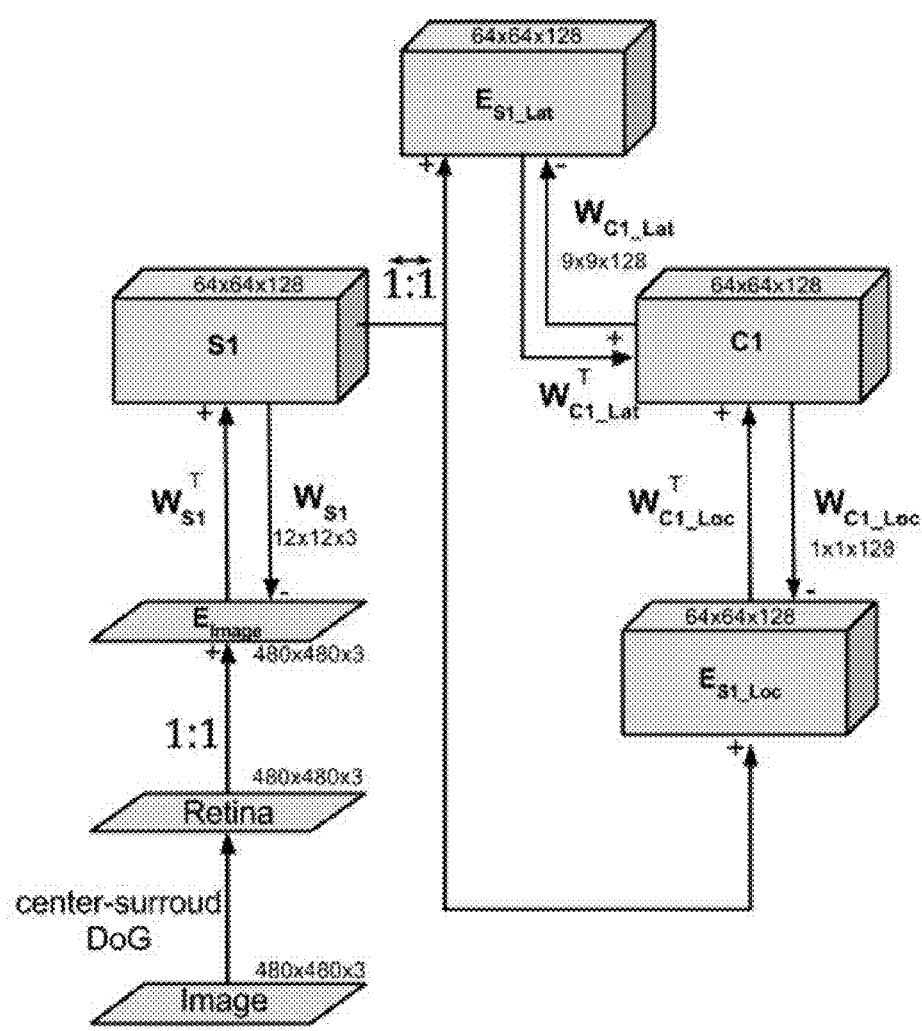
FIG. 4 illustrates a schematic of a lateral C1 network, according to an embodiment of the present invention.

FIG. 4 depicts a schematic diagram 400 of how local and lateral connections can be combined to learn a $2^{nd}$ stage of feature detectors that are more invariant to local image transformations than their inputs from $1^{st}$ stage selective feature detectors. The error layer $E_{Img}$ outputs the difference between the input Image after DoG filtering, represented by Retina, and the reconstructed image generated by convolving S1 output activity with the columns of connection matrix $W_{si}$. Similarly, the error layers $E_{S1\_Loc}$ and $E_{S1\_Lat}$ output the difference between the true S1 activity and the S1 activity predicted by C1 activity via the local and lateral connectivity matrices $W_{C1\_Loc}$ and $W_{C1\_Lat}$, respectively. $W_{S1}$, $W_{C1\_Loc}$ and $W_{C1\_Lat}$ are adjusted at the end of each video frame so as to minimize $E_{Img}$, $E_{S1\_Loc}$, and $E_{S1\_Lat}$, respectively. Self-interaction (not depicted) ensures that S1 and C1 activity remains constant when the input from their presynaptic error layers is zero.

Figure 5:
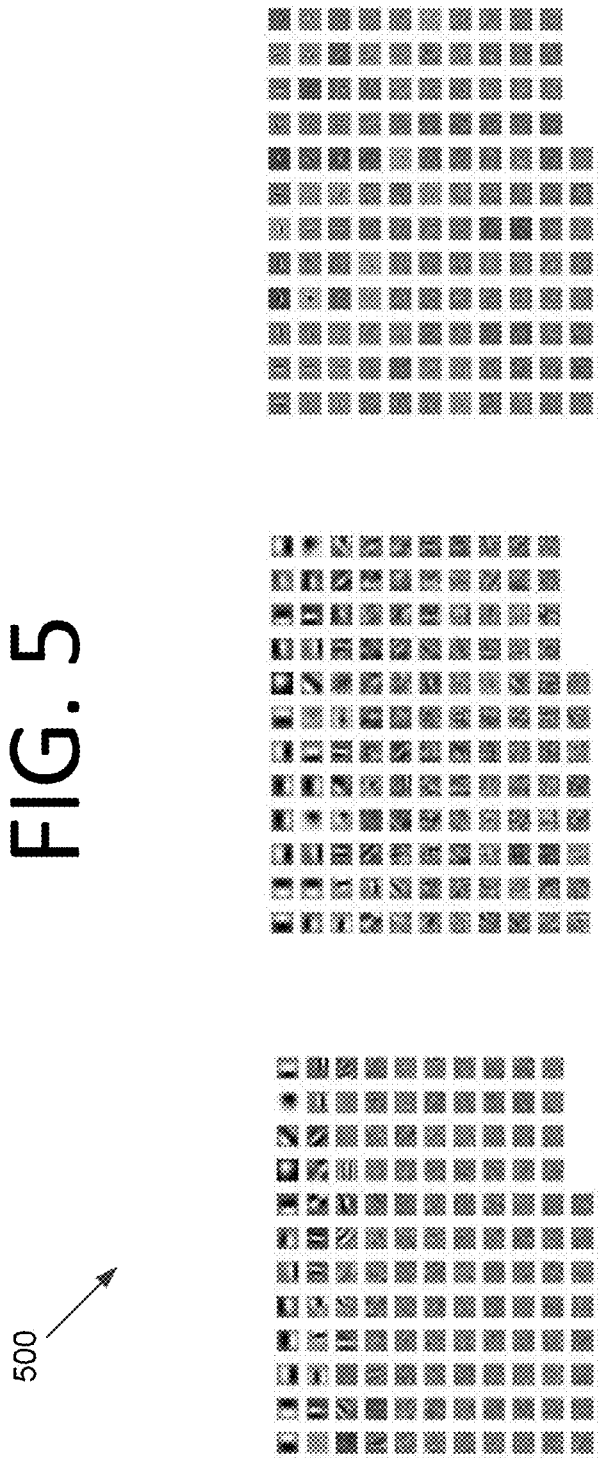
FIG. 5 illustrates learned dictionaries of local and lateral features, according to an embodiment of the present invention.

FIG. 5 depicts three feature dictionaries 500 corresponding to the first stage of selective feature detectors $W_{si}$ denoted by S1 (left), the local connections $W_{C1\_Loc}$ (center), and lateral connections $W_{C1\_Lat}$ that make up the inputs to the $2^{nd}$ stage of invariant feature detectors C1 (right). $W_{S1}$, $W_{C1\_Loc}$, and $W_{C1\_Lat}$ are plotted for each dictionary element in order of activation frequency. S1 and local C1 features, spanning a 12×12 patch of image pixels and corresponding to connectivity matrices $W_{S1}$ and $W_{C1\_Loc}$, respectively, are similar to one another and look qualitatively like V1 simple cell receptive fields. Lateral C1 features, spanning a patch of 44×44 image pixels and corresponding to $W_{C1\_Lat}$, encode smooth continuations of the local C1 receptive fields.

Figure 6A:
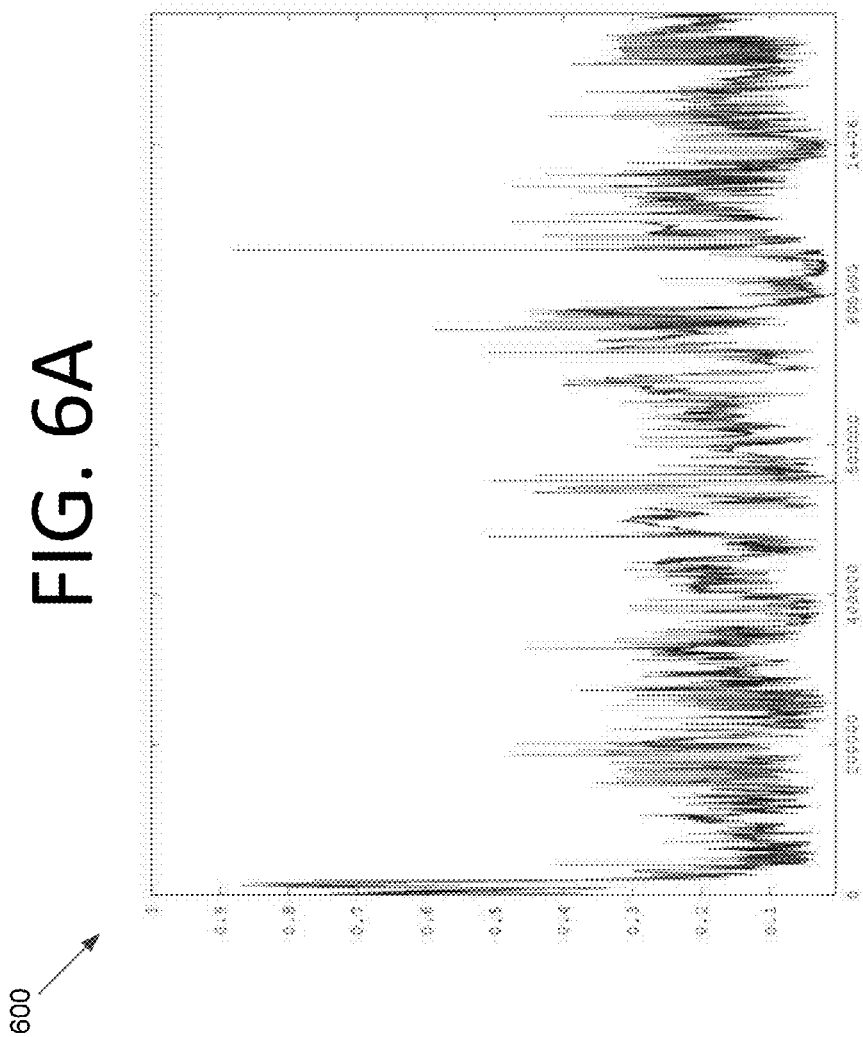
FIG. 6A is a graph illustrating frame-to-frame percent changes in C1 representations, according to an embodiment of the present invention.
Figure 6B:
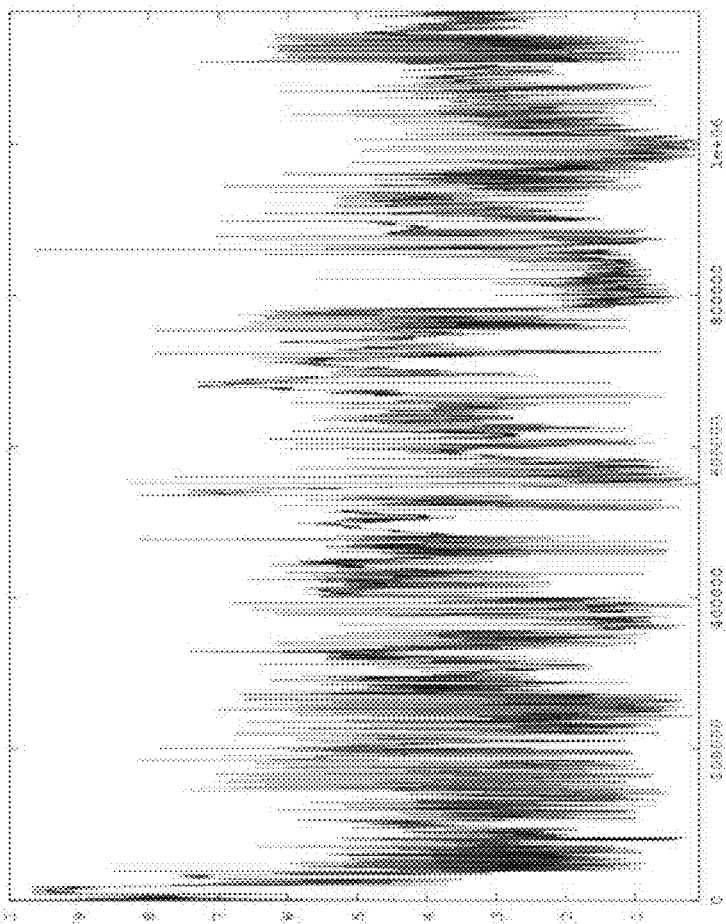
FIG. 6B is a graph illustrating frame-to-frame percent changes in S1 representations, according to an embodiment of the present invention.

Graphs 600, 610 of FIGS. 6A and 6B compare the invariance of C1 vs. V1 representations, respectively, over the course of a long series of independent short video sequences. The percent change in the C1 (graph 600) and S1 (graph 610) representations is quantified by the ratio of the number of dictionary elements whose activities in successive video frames either switched from zero to non-zero or from non-zero to zero divided by the total number of unique non-zero elements in either frame. Sparse C1 representations are substantially more stable than the sparse S1 representations.

Motion Detection

As discussed above, some embodiments include motion detection. Most models of the mammalian motion-processing stream are based on motion-energy filters that mathematically describe the response properties of direction-sensitive V1 neurons, but lack a clear physiological interpretation. In some embodiments, a more physiological model of V1 direction-selective cells is implemented that uses connection weights, realistic conduction delays, and separate excitatory and inhibitory channels. The enhanced model in such embodiments could implement a conventional motion-energy model, but with the added benefit of using more realistic neuronal and network dynamics thanks to the aforementioned hierarchical top-down properties. The neural network model may exhibit similar responses to the mathematically defined motion-energy filters, but may admit a more direct interpretation in terms of the underlying physiology and anatomy. Motion simulation is well documented, and standard published models have been tested as components in the presented deep, hierarchical network. Some embodiments may include a custom or enhanced motion detection algorithm.

Neuromorphic algorithms of some embodiments emulate the visual processing streams found in the primate cortex. These streams emphasize, among other modalities, texture/color, shape/form, and motion. These data streams may be analyzed using a single deep network and then combined within the network. The results of some embodiments have a very high rate of detection, which is vital for practical applications such as defense.

Collective Output

Primary output for each of the three processing modalities (i.e., color/texture, shape/form, and motion) may be in the form of rasterized PNG images, where the pixel values represent the different categories or levels of activation. This information may then be combined into a coherent and intelligible output utilizing a spatially aware combination method. Alternatively, these modalities may each be represented as neuronal activity files that can be combined within the hierarchical network itself.

In the case that the three information streams are output in the form of PNG files, combining the information into coherent and intelligible output may be accomplished using an adaptation of a spatial clustering algorithm, such as the DBSCAN algorithm. In an adaptation of the DBSCAN algorithm, the three primary inputs may be formatted as points in a matrix the size of the video frame. The algorithm may form clusters based on hits that are within a close proximity and of the same label. The minimum volume enclosing ellipsoid may then be found to get the appropriate size and orientation of the bounding box. Motion detections, which may not have a label, may modify label confidence values. Contextual clues may also be used in the form of background labels from the color/texture detection approach to modify the confidence. For example, it is unlikely to see a car surrounded by sand, so car hits with sand backgrounds may be given a lower confidence. In the case of the independent streams being combined within the network, simple coding strategies can be employed to combine feature analysis within a given spatial region with respect to the input space. For example, if motion selective feature detectors and color/texture selective feature detectors have a receptive field that covers the same spatial region of the input space, they may be afferent onto a feature detector in a higher layer.

FIG. 7 illustrates images 700 of examples of clustering algorithm output, according to an embodiment of the present invention. Original image 710 includes abounding box overlaid around a car. Image 720 shows bounding box output within a blank frame. Image 730 shows an example of clustering for the bounding box. The lines are from shape/contour detection and the dots are from color/texture detection.

Some embodiments of the algorithm were scored using qualitative measures, as well as the DARPA established scoring metric. The DARPA metric follows the equation:

$$\text{Overlap Ratio} = \frac{G_i^{(t)} \cap D_i^{(t)}}{G_i^{(t)} \cup D_i^{(t)}} \quad (3)$$

where $G_i^{(t)}$ denotes the $i^{th}$ ground-truth object in frame t and $D_i^{(t)}$ denotes the $i^{th}$ detected object in frame t. From Eq. (3), it can be concluded that the overall score will have a range from minus infinity to 1, where 0 is having no detections at all. This equation heavily penalizes false detections (see FIG. 8).

In 1,994 frames, an implemented embodiment of the algorithm scored a −3.38 in the car category. In this category, there were 2613 false negatives and 16733 false positives at 20% confidence. The true positive rate was 0.39 and the number of false positives per frame was 8.39. The high number of false positives reflected the fact that the color/texture model often assigned two detections to each automobile. Other embodiments, however, solve this issue in the combined output.

Figure 8:
FIG. 8 illustrates an image of example output of object detection on a video frame, according to an embodiment of the present invention.

FIG. 8 illustrates an image 800 of example output of object detection on a video frame, according to an embodiment of the present invention. Every car is detected with one additional detection that is classified as a false positive. Although a good detection rate was seen, the algorithm did not score well in the DARPA metric due to false positives.

Shape and Color/Texture Processing Algorithms

Figure 9:
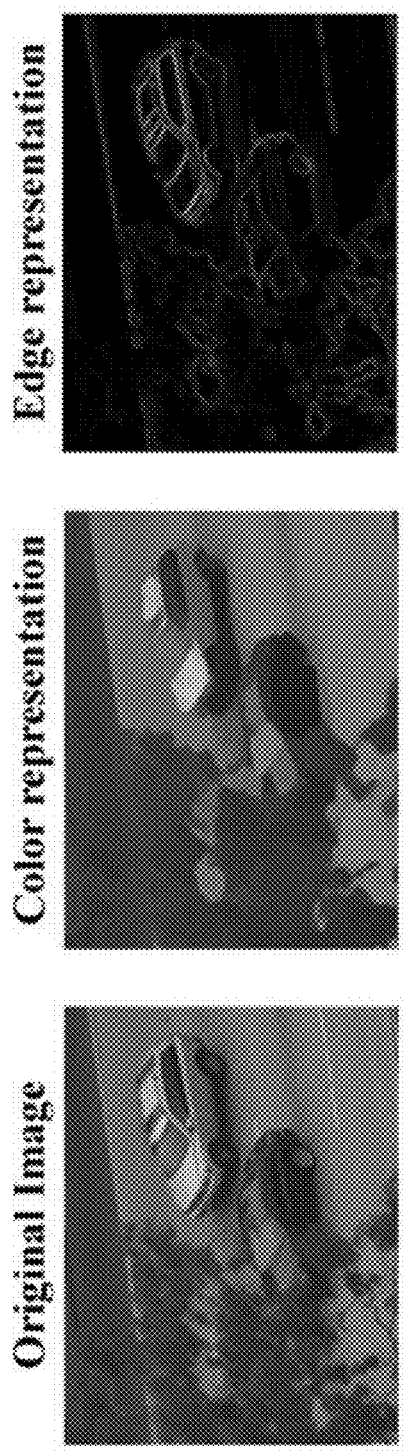
FIG. 9 illustrates representative images of what the retinal emphasis should be, according to an embodiment of the present invention.

The input to the color/texture processor may be down-sampled to ¼ the original size, which removes much of the high-frequency luminance information. Presenting each processor with a copy of the image is consistent with biological findings. Studies have shown that whole retinotopic field representations occur in each of the modules (stripes) of V2, supporting the claim that the modules utilize different processing methods with the same retinal input data. It has also been noted that different stripes receive afferents from different populations of V1 neurons, which perform distinct pre-filtering processes on the retinal input. FIG. 9 shows representative images 900 of what the retinal emphasis should be.

Shape/Contour Processing

Some embodiments pre-filter the shape processor input using a canny-edge filtering technique to effectively remove any low spatial-frequency and color information. This pre-filtered input can be delivered to an independent shape processing algorithm, or into an embedded shape processing stream in the hierarchical network described with respect to some embodiments herein.

Some embodiments take into account lateral interactions based on object-distractor difference (ODD) kernels. ODD kernels are intended to represent lateral interactions between cortical neurons located at the same cortical layer. Rather than learning a dictionary of features whose complexity increases traveling up a cortical hierarchy, some embodiments of lateral interactions use a very simple set of feature detectors, corresponding to edge detectors spanning eight orientations between 0 and 180 degrees. The activation of these feature detectors may be modulated by extensive lateral interactions based on co-occurrence of edges.

Figure 10:
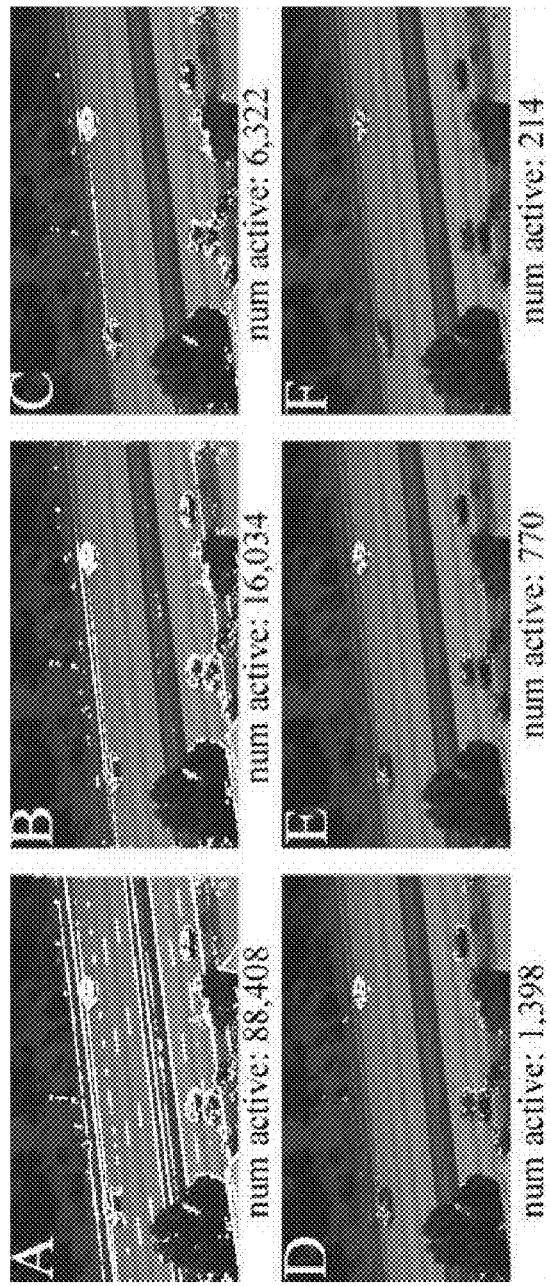
FIG. 10 illustrates images of outputs of edge-detection layer (A) followed by 5 layers (B-F) of ODD car-distractor kernels, according to an embodiment of the present invention.

In each layer of processing, two kernels may be trained that represent the target class (e.g., cars) and the distractor class (the rest of the scene). The kernels may be trained using ground truth bounding boxes, where edge detectors with a receptive field within the boxes are maximally supported for the target class, and vice versa for the distractor class. The neurons may be supported via pairwise interactions, although this could theoretically be expanded to n-wise interactions for improved performance. It has been demonstrated that 3-way interactions result in improved performance over 2-way interactions. It is presumed that this trend will continue to n-way interactions. The final stage of processing for each layer may be the ODD kernel, which represents the normalized difference between the target and distractor kernels. In some embodiments, 5 layers were trained in this manner, with layer afferents coming directly from previous layers (the first layer may receive the canny-filtered image as an input). The number of activated neurons in some embodiments was reduced by nearly 4 orders of magnitude from about 88,000 in the first layer, prior to any lateral interactions, to 214 in the final layer (see images 1000 of FIG. 10—the "num active" term indicates the total activity summed over all neurons in each image). This was all done in real time on a 16 node, 8 core-per-node computer.

This ODD-kernel processor has been implemented in the same framework as the aforementioned hierarchical method. In some embodiments, the ODD-kernel processor could be embedded into the hierarchical model and enhanced with top-down and interlayer lateral connectivity.

Color/Texture Processing

Some embodiments implement semi-supervised object detection using sparse generative cortical models. Observations of sparse patterns of neural activation in the visual cortex have led to models on sparse image-patch representations using adaptive, over-complete image feature dictionaries learned from data. These models are generative, allowing reconstruction of the input image, and are compatible with hierarchical models of the cortex (extending standard HMAX approaches). These models can also drive many-category classification of image patches for object detection within a large video frame.

Figure 11:
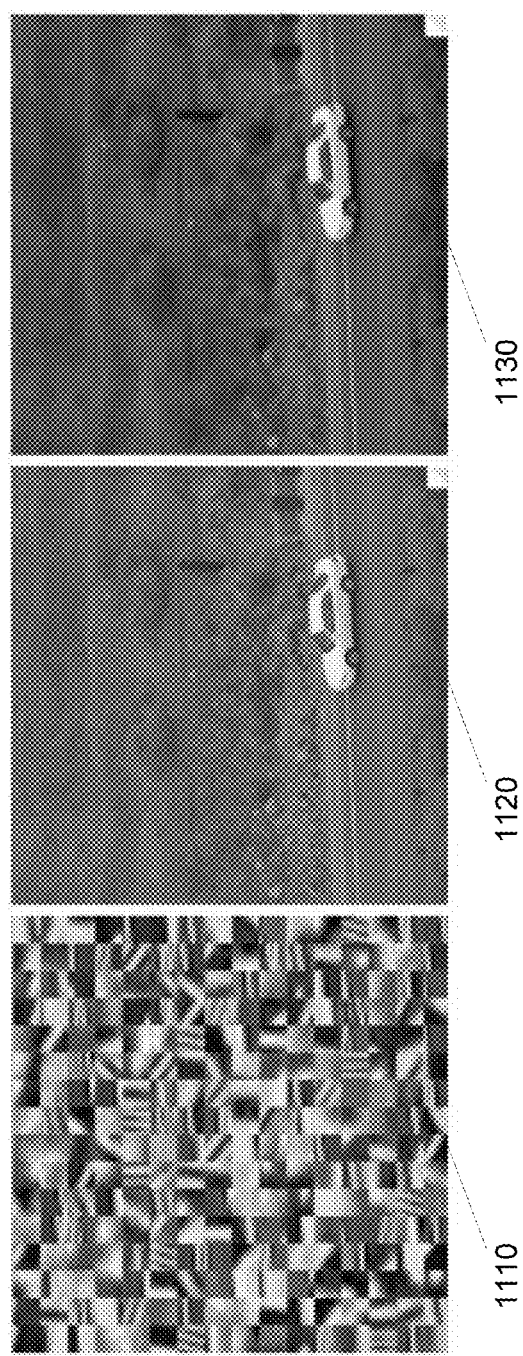
FIG. 11 illustrates images from color/texture processing, according to an embodiment of the present invention.

Some embodiments learn a sparsified overcomplete color/texture feature dictionary for an image dataset (see image 1110 of FIG. 11). The retinal model may down-sample the input frame to remove video compression artifacts, reduce computational expense, and de-emphasize some of the high-frequency luminance information. The primary visual cortex (V1) S-cell layer may use greedy matching pursuit to build a local sparse dictionary representation. The dictionary elements may be learned using a Hebbian rule (i.e., that defined in Donald Hebb's 1949 book *The Organization of Behavior*). The S-cell columns may be very sparse, typically with <5% of local feature detectors active in any given column. However, the S-cell columns may still allow for good reconstruction of the input image in distinct to standard HMAX approaches (see image 1130 of FIG. 11 versus original image 1120). The V1 C-cell layer may apply a local max pooling operation, producing a translation-tolerant representation of image patches. This pooling operation may cause a loss of any local shape information, but may not significantly affect the ability to identify objects using color and texture information. Even after pooling, the C-cell columns may be quite sparse. Note that frame differencing may not be used. This may allow detection of objects that are stationary within the frame.

Figure 12:
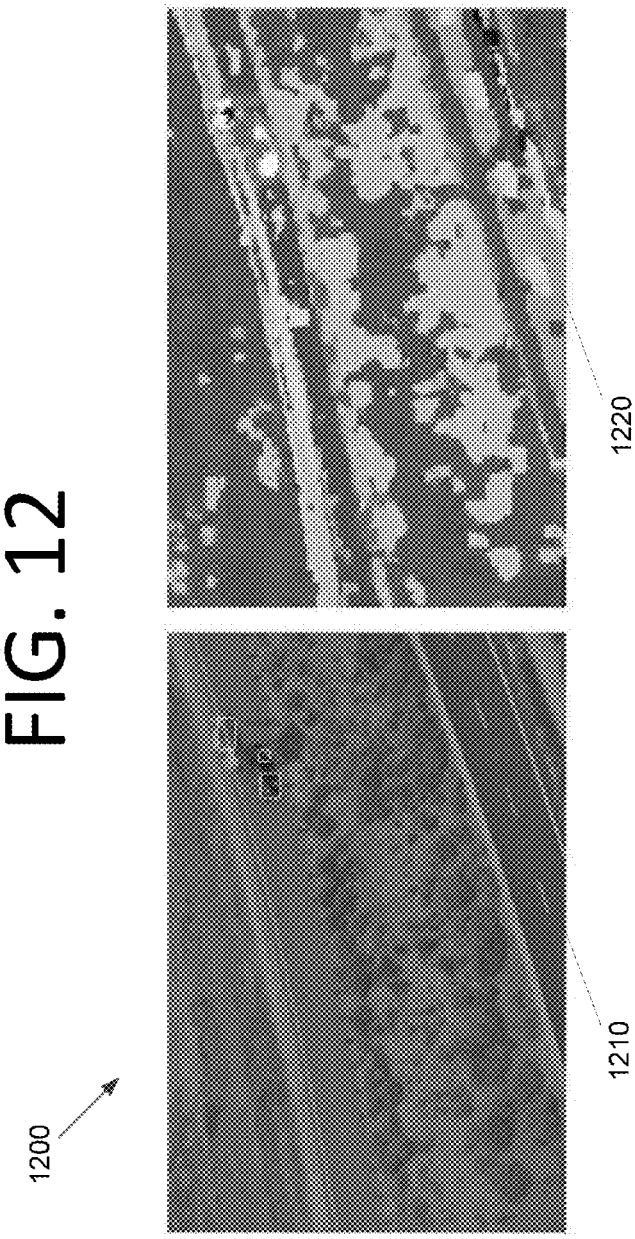
FIG. 12 illustrates images of individual hits with bounding boxes and background clustering, according to an embodiment of the present invention.

For object detection and classification, a multi-category generative model may be used based on k-means clustering of sparse C-cell column responses. This model may be trained in a semi-supervised way, allowing the image background to divide up into unlabeled categories (e.g., 30 categories—setting this number is a meta-learning task). The categories, on inspection, appear strongly correlated with naturally occurring background scene object categories, including tree foliage, grass, pavement, water, and beach (see images 1200 of FIG. 12). Image 1210 shows individual car hits with green bounding boxes. Image 1220 shows the background clustering (closeness in color has no meaning). The color/texture algorithm successfully segments the road, ground, shrubbery, fencing, and lane markings. The segmentations can be easily combined into parent categories (e.g., "car", "road", and "not road") to make it easier to classify target objects.

This set of background categories may then be augmented with the target "car" category learned using the same sparsifying dictionaries for labeled image patches (i.e., supervised learning may be used for target categories only). The final image patch classifier algorithm may be a Euclidean (L2) minimum distance classifier in this multi-category space of category mean vectors. The multi-category classifier may be a small component of the overall computation time (which may be dominated by the formation of sparse representations in V1 S-cell columns) and may produce whole scene visualizations that provide additional contextual cues (e.g., correlation of cars with roads, boats with water, etc.) that could be exploited for object detection, but are not utilized here.

In some embodiments, the color/texture processor could be implemented in a hierarchical network. Sparse feature-based dictionaries could be learned in each layer using feature detectors and invariance could be introduced using a second stage of context-aware, laterally connected detectors. Each layer, containing two stages of processing, could be connected in a bottom-up and top-down fashion. Such embodiments could analyze color/texture features much in the same way as certain other embodiments, but without the addition of pooling for added invariance.

Combining Visual Pathway Models

Each classifier may be represented as a binary detector. For the shape/contour processing model, only the final kernel level may be used in some embodiments and all remaining edges may be counted as "car" hits, or hits for whatever other object is sought. For the color/texture model, all pixels may be counted as hits that are closer to the "car" cluster than other clusters. The hit rate and false alarm values may be derived on a pixel level, where all pixels inside a ground-truth box may be considered "car" and all pixels outside may be considered "not car". This may necessitate radial dilation of the classifier hits to fill in more of the box area. The receiver operating characteristic (ROC) graph is a method of plotting that compares the false alarm rate to the true positive rate, resulting in a curve that has an area that corresponds to performance at a detection tack, where increased area indicates better performance. A ROC curve for comparing "car" detections to "not car" detections may be populated by steadily increasing the dilation radius and observing the resulting hit and false alarm values.

Combining ROC Curves

First, a false alarm threshold may be chosen for the two input classifiers. Then, the optimal Boolean combination rules may be computed (5 out of a possible 16) following a procedure to create an "LR-ROC" curve. More specifically, given n binary classifiers, there are $2^{2^n}$ possible ways to combine their binary outputs. Consider the simple case of two classifiers such as a texture/color classifier and a shape/contour classifier. In the preceding case example, the classifiers can be extracted to be binary in the sense that their output is either "car" or "not car". These classifiers can be combined using 16 different Boolean (A AND B, A OR B, A XOR B, etc.) operators. Of these 16 Boolean operators, 11 have been proven to be trivial in nature. The optimal operator of the remaining 5 operators may be computed by comparing the likelihood ratio (LR) of each operator. The likelihood ration receiver operating curve (LR-ROC) may be defined as a curve that weakly dominates any combination of Boolean classifiers, where weakly dominating indicates that it is no less than the maximum performing classifier at any given instance.

This curve gives ROC data points that represent the ideal set of Boolean algebra combinations of the input binary classifiers. Because algorithms of some embodiments are functionally independent, the optimal set may be the same as what would be used for a convex hull ROC analysis. Convex hull ROC analysis requires completely independent algorithms, and states that if the two trivial points (0,0) and (1,1) are ignored, the false alarm rate can be maximally reduced by performing an AND operation on the algorithms, and the hit rate may be maximally increased by performing an OR operation. The medial point between the two operations is the classifier with the highest likelihood ratio, which is the color/texture processor for the false alarm threshold. However, given that the algorithms are not completely independent, analysis techniques for assessing optimal combination schemes may be used. The evaluation schemes may be compared to the quantitative output performance of a hierarchical network, where each stream is computed independently and connected to a combinatorial layer, which would use the same non-linear summing dynamics found in earlier processing layers to combine n input streams.

Computing Bounding Box Coordinates

The individual classifier outputs may be represented as logical binary images, with a value of 1 indicating "car" hits. These images may be combined using the optimal rule for the given false alarm rate described above. The matrix of hits may then be clustered using a spatial clustering algorithm called DBSCAN. The algorithm iterates through all points and clusters them based on a density metric that is computed from two input parameters. The parameters may then be optimized based on the ROC performance of the clusters. Once the hits are clustered, the minimum volume enclosing ellipsoid may be found to get the appropriate size and orientation of the bounding box. The final output may be a comma separated value (CSV) file of bounding box locations, labels, and label confidences.

Pathway Independence

Several metrics were explored to establish the level of independence between the color/texture and shape/contour algorithms in some embodiments. The least quantitative metric was "functional independence", which is described as requiring the same Boolean operators for an optimal combination as two statistically independent algorithms. Conditional independence was also checked, such that $P(Y_1, Y_2|H_c) \cong P(Y_1|H_c)*P(Y_2|H_c)$ for $c \in \{0,1\}$, where $Y_1$ is the color/texture processor, $Y_2$ is the shape processor, $H_0$ is the null hypothesis (no car is present), and $H_1$ is the alternate hypothesis (car is present).

Here, a relative approximate equality condition was used, although the theoretical calculation may be performed with an exact equals condition. The joint probability under $H_1$ to be $P(Y_1, Y_2|H_1)=0.1482$ and the marginal product to be $P(Y_1|H_1)*P(Y_2|H_1)=0.1046$. Under $H_0$, the joint probability was $P(Y_1,Y_2|H_0)=0.013$ and the marginal product was $P(Y_1|H_0)*P(Y_2|H_0)=0.0006$. Additionally, a covariance was computed under $H_1$ of $COV_{H_1}=0.0437$ and under $H_0$ of $COV_{H_0}=0.0012$, where a covariance of COV=0 indicates independence. Finally, the mutual information (derived from the Kullback-Leibler distance) between the two classifiers was computed, where a 0 value indicates complete independence. Under $H_1$ the mutual information was $I(Y_1; Y_2)=0.0746$ and under $H_0$ the mutual information was $I(Y_1; Y_2)=0.0058$. This analysis demonstrates that the two algorithms are independent enough to be considered separate processing forms. Although the algorithms were not completely independent, there are dependencies between processing modalities in the ventral visual cortex as well, in part due to lateral interactions.

Figure 13:
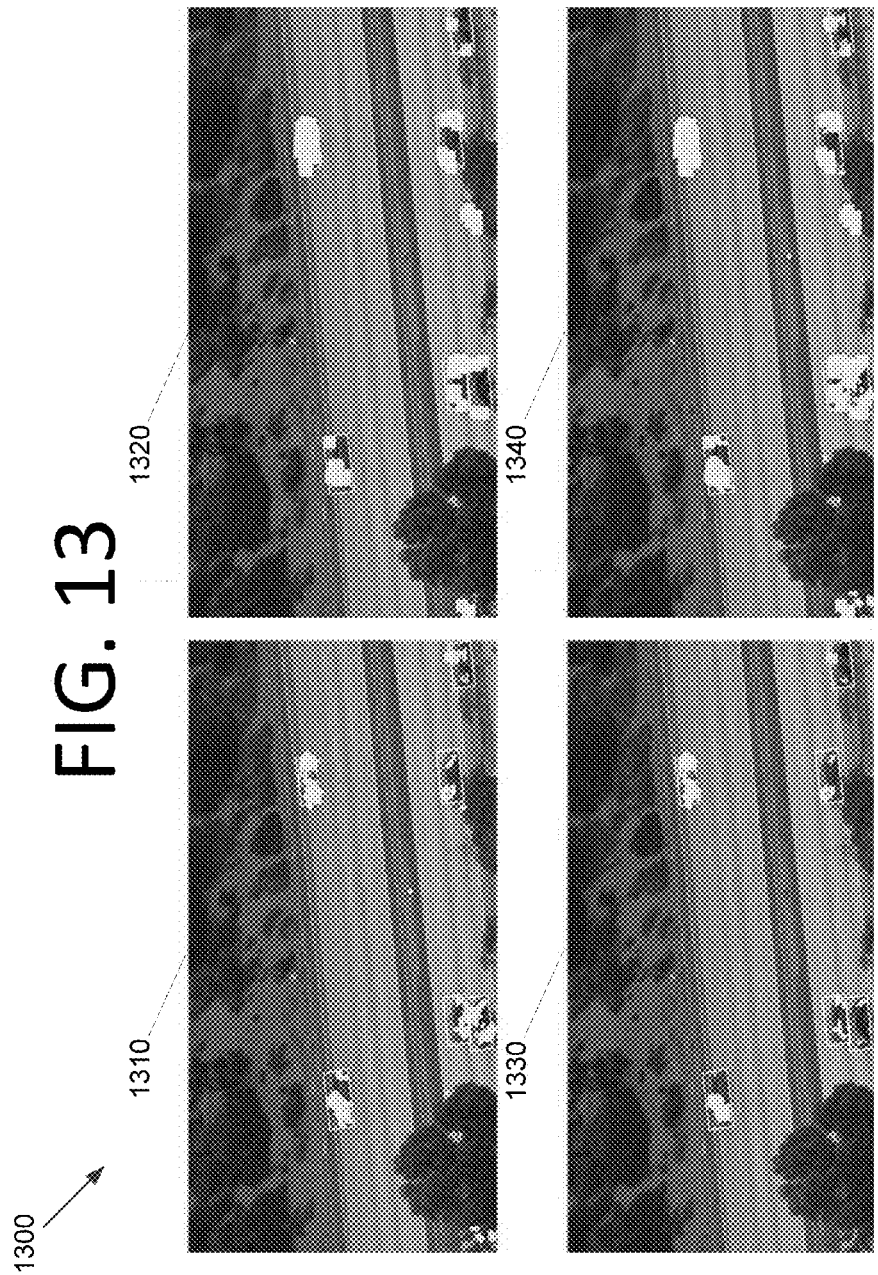
FIG. 13 illustrates images of hits in representative frames from different processors, according to an embodiment of the present invention. The top left portion depicts the output of a color/texture processor. The top right portion represents detections from a shape/contour processor. The bottom two images are potential combinations of the two processors.

FIG. 13 illustrates images 1300 of hits in representative frames from different processors, according to an embodiment of the present invention. Image 1310 shows the color/texture processor, image 1320 shows the shape processor, image 1330 shows the combined processor using the AND operator, and image 1340 illustrates the combined processor using the OR operator. The white boxes represent ground-truth labels. The hit rates for this particular frame were 0.38 (1310), 0.49 (1320), 0.23 (1330) and 0.64 (1340). The false alarm rates were 0.002 (1310), 0.010 (1320), 0.0006 (1330) and 0.012 (1340). The AND combination removed all of the false positives, while hitting every car to some degree. FIG. 13 indicates that the two functionally independent processing modalities hit on different areas of the car (somewhat difficult to see due to the imposed dilation). It is also apparent that the areas where the two processors miss are different, suggesting that they respond to different types of evidence for the presence of a target.

Figure 14:
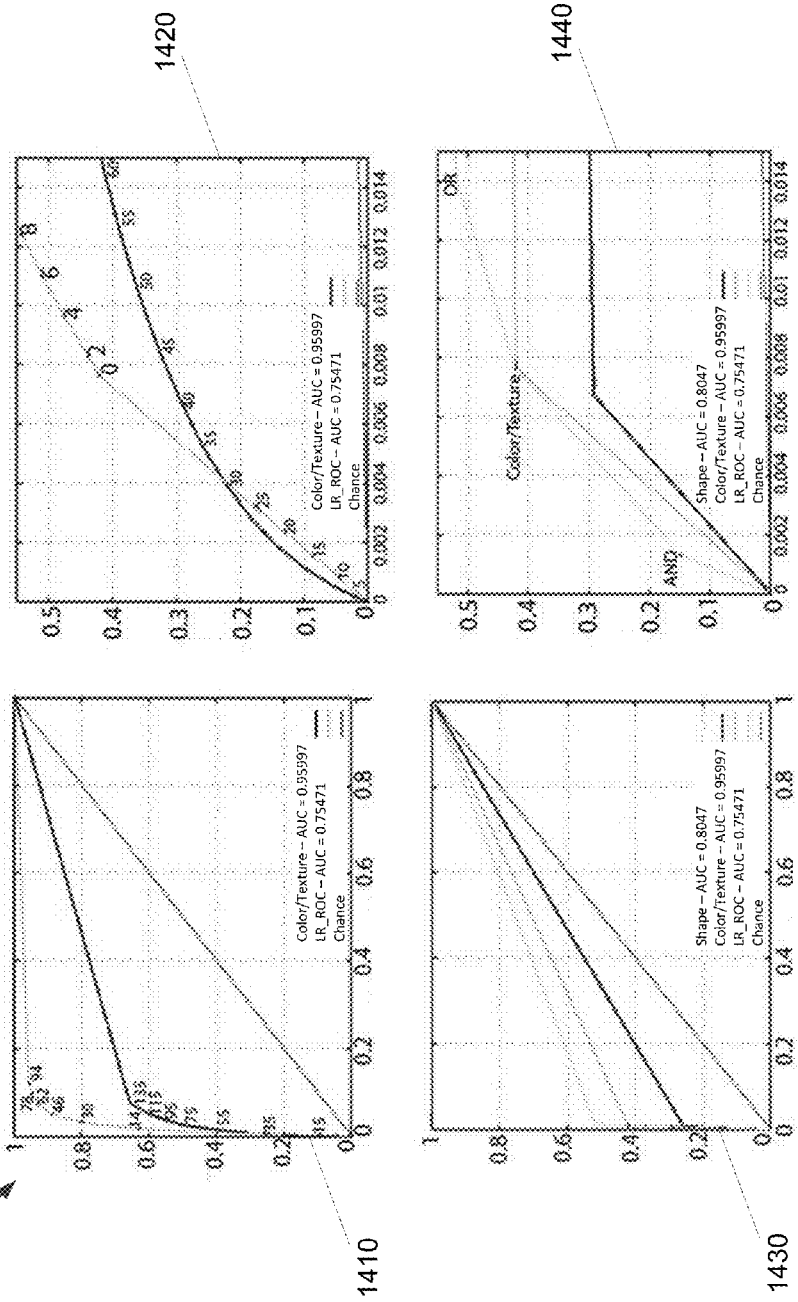
FIG. 14 illustrates graphs of ROC curves for hit rates versus false alarm rates, according to an embodiment of the present invention.

FIG. 14 illustrates graphs 1400 of ROC curves for hit rates versus false alarm rates, according to an embodiment of the present invention. Graph 1410 shows the ROC curve for shape and color/texture processors. Graph 1420 shows a zoomed portion of graph 1410. The shape processor does better at lower false alarm thresholds. Graph 1430 shows the results of combining the independent detectors' ROC curves into a curve representing a single detector. The three Boolean rules used were AND, Color/Texture (i.e., the maximally performing algorithm at the moment), and OR. The optimal classifier is chosen at the middle point, which at the given false alarm threshold is the Color/Texture classifier. Graph 1440 shows a zoomed portion of graph 1430 with lower false alarm rates. The area under curve (AUC) value is the area under the curve, an overall metric for classifier performance when analyzing ROC curves.

Graphs 1400 of FIG. 14 indicate that the shape processor outperformed the color/texture processor for low false alarm thresholds, but the color/texture processor did better at higher false alarm thresholds. The shape hits were sparser than the color/texture hits and had better discrimination at high confidence levels. The combined ROC (LR-ROC) curve used two data points at similar false alarm rates from the shape and color/texture processors. The labeled points on the LR-ROC curve represent optimal Boolean combination rules for combining the two algorithms at the given false alarm threshold.

Quantitative results were analyzed using the DARPA scoring metric. The metric required that bounding boxes be given for detections. The metric counted a detection box as a hit if the intersection between the ground-truth box and the detection box divided by the union between the two was greater than 0.2. False negatives occur if the overlap is less than 0.2 or if two detection boxes overlap a ground-truth box. The test set consisted of 113 frames with 471 ground-truth car bounding boxes. The algorithm in the embodiment that was tested had 273 correct detections, 303 false positives, and 105 false negatives.

Figure 15:
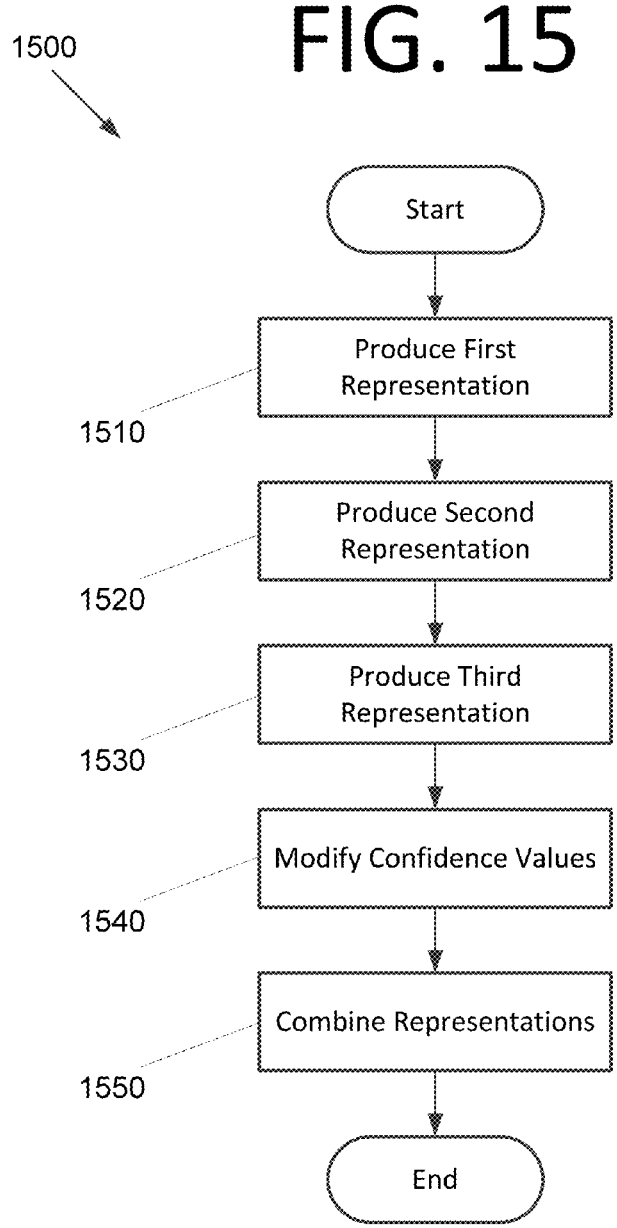
FIG. 15 is a flowchart illustrating a method for combining multiple object detection approaches into a single combined approach, according to an embodiment of the present invention.

FIG. 15 is a flowchart 1500 illustrating a method for combining multiple object detection approaches into a single combined approach, according to an embodiment of the present invention. In some embodiments, the method of FIG. 15 may be performed, for example, by computing system 1600 of FIG. 16. The method begins with producing a first independent representation of objects in an image dataset using a color/texture detection algorithm at 1510. The color/texture detection algorithm may be configured to learn a sparse overcomplete feature dictionary for the image dataset. The first independent representation may include rasterized PNG images and pixel values represent different categories.

A second independent representation of objects in the image dataset is produced using a shape/contour detection algorithm at 1520. The shape/contour detection algorithm may be configured to take into account lateral interactions based on object-distractor difference (ODD) kernels. The second independent representation may include neuron activity files. In some embodiments, for each frame in the image dataset, the color/texture detection algorithm gives a single output and the shape/contour detection algorithm gives an output for each object of interest.

A third independent representation of objects in the image dataset is produced using a motion detection algorithm at 1530. The motion detection algorithm may be configured to derive spatio-temporal filter properties for V1 neurons from their synaptic input weights, tuned such that a center frequency of a temporal band ($\omega_{t0}$) divided by a center frequency of a spatial frequency band ($\omega_{x0}$) gives a velocity matched by a V1 cell. The spatial filter may be implemented using a Gaussian-shaped excitatory connection surrounded by inhibitory Gaussian shaped flanks.

Confidence values are modified at 1540. In some embodiments, motion detections are used to modify confidence values. In certain embodiments, in addition to or in lieu of using motion detections to modify confidence values, background labels from the color/texture detection algorithm may be used to modify confidence values.

The first, second, and third independent representations are then combined into a single coherent output at 1550 using a combinatorial algorithm. The representations may be formatted as points in a matrix a size of a video frame of the image dataset. Clusters may be formatted based on hits that are within a predetermined proximity and of a same label. A minimum volume enclosing ellipsoid may be found to get an appropriate size and orientation of a bounding box.

In some embodiments, a single hierarchical network that produces neural activity as its output could represent all the three independent processing streams. In such embodiments, the neural activity could be combined within a hierarchical network by adding a top, combinatorial layer to the network. This combinatorial layer could perform a weighted sum on the given inputs and output descriptive neural activity according to what is in the presented input. This neural activity could be used as labels for individual objects in the presented input.

Figure 16:
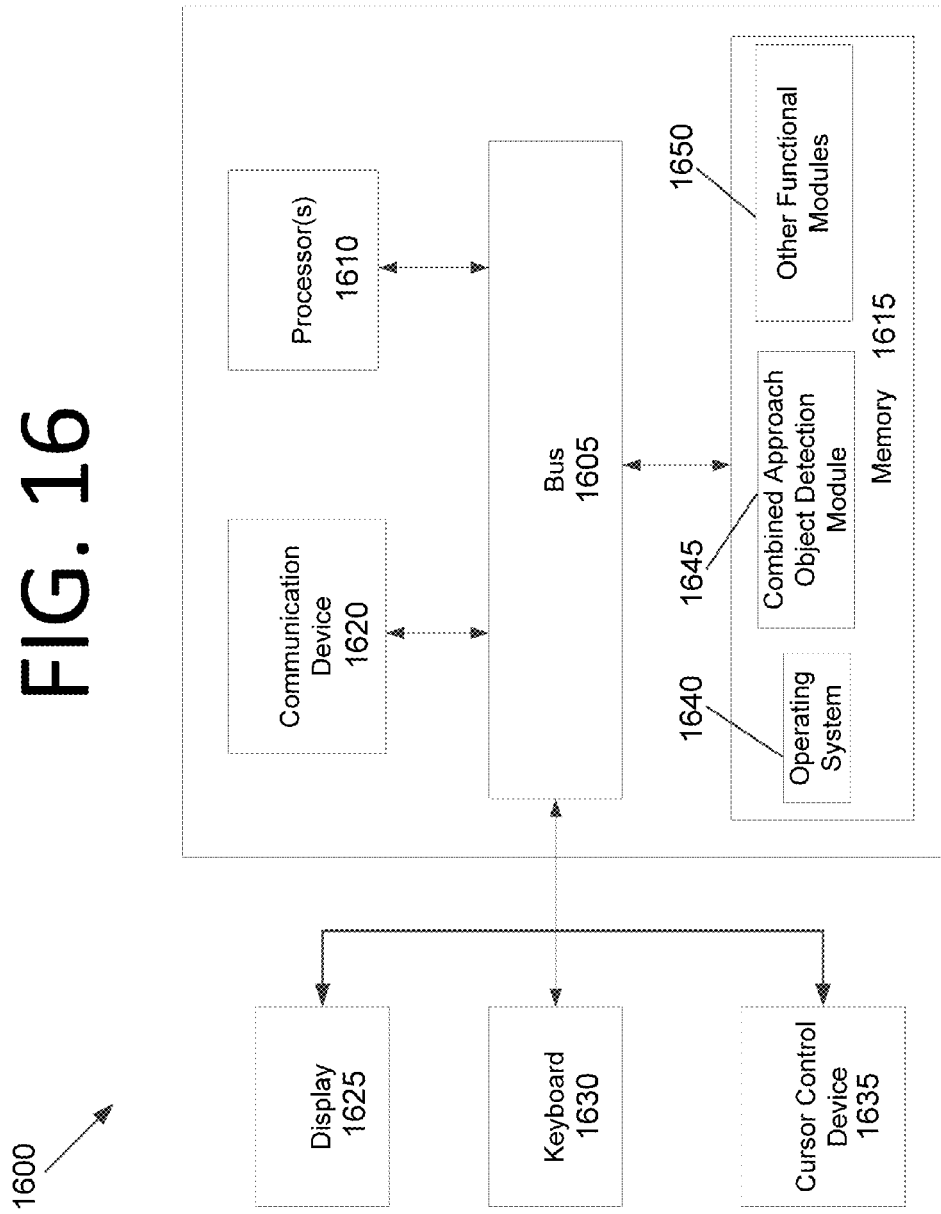
FIG. 16 is a block diagram of a computing system configured to implement a combined approach to object detection in an image or video, according to an embodiment of the present invention.

FIG. 16 is a block diagram of a computing system 1600 configured to implement a combined approach to object detection in an image or video, according to an embodiment of the present invention. Computing system 1600 includes a bus 1605 or other communication mechanism for communicating information, and processor(s) 1610 coupled to bus 1605 for processing information. Processor(s) 1610 may be any type of general or specific purpose processor, including a central processing unit ("CPU") or application specific integrated circuit ("ASIC"). Processor(s) 1610 may also have multiple processing cores, and at least some of the cores may be configured to perform specific functions. Computing system 1600 further includes a memory 1615 for storing information and instructions to be executed by processor(s) 1610. Memory 1615 can be comprised of any combination of random access memory ("RAM"), read only memory ("ROM"), flash memory, cache, static storage such as a magnetic or optical disk, or any other types of non-transitory computer-readable media or combinations thereof. Additionally, computing system 1600 includes a communication device 1620, such as a transceiver, to wirelessly provide access to a communications network.

Non-transitory computer-readable media may be any available media that can be accessed by processor(s) 1610 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1610 are further coupled via bus 1605 to a display 1625, such as a Liquid Crystal Display ("LCD"), for displaying information to a user. A keyboard 1630 and a cursor control device 1635, such as a computer mouse, are further coupled to bus 1605 to enable a user to interface with computing system 1600. However, in certain embodiments such as those for mobile computing implementations, a physical keyboard and mouse may not be present, and the user may interact with the device solely through display 1625 and/or a touchpad (not shown). Any type and combination of input devices may be used as a matter of design choice.

In one embodiment, memory 1615 stores software modules that provide functionality when executed by processor(s) 1610. The modules include an operating system 1640 for computing system 1600. The modules further include a combined approach object detection module 1645 that is configured to combine multiple separate object detection approaches into a coherent output. Computing system 1600 may include one or more additional functional modules 1650 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIG. 15 may be performed by a computer program, encoding instructions for the non-linear adaptive processor to perform at least the method described in FIG. 15, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the method described in FIG. 15, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
combining, by a computing system, pixel-based and feature-based dictionaries to reduce effective dimensionality of feature-based inputs, augmenting learning of the feature-based dictionaries;
producing, by the computing system, a hierarchical network of a plurality of computational layers for color/texture analysis of an image or video;
creating vertical competition, by the computing system, between the plurality of computational layers by including top-down feedback from subsequent layers to previous layers; and
generating cortical representations, by the computing system, at each hierarchical layer incorporating the top-down feedback to reduce redundancy and increase sparseness of the generated cortical representations.

2. The computer-implemented method of claim 1, further comprising:
employing pixel-based dictionaries, by the computing system, to guide acquisition of feature-based dictionaries by training a first layer of dictionary elements on image patches and training subsequent layers on a combination of direct feature-based inputs and down-sampled, pixel-based inputs arising from images generated by sparsely activated features of a previous layer.

3. The computer-implemented method of claim 1, further comprising:
subdividing the plurality of computational layers, by the computing system, into a first stage of selective feature detectors and a second stage of invariant feature detectors that are implemented by combining local and lateral dictionaries, wherein
the selective feature detectors form a first stage of processing within each layer of the plurality of computational layers, and
the invariant feature detectors form a second stage of processing within each layer of the plurality of computational layers.

4. The computer-implemented method of claim 3, further comprising:
creating lateral competition, by the computing system, among invariant feature detectors in a given layer by receiving and processing spatially convergent lateral input from a surrounding neighborhood of the selective feature detectors in the layer, resulting in interlayer invariance to linear and non-linear transformations while maintaining scalability.

5. The computer-implemented method of claim 1, wherein the entire hierarchical network is learned simultaneously.

6. The computer-implemented method of claim 1, further comprising:
training, by the computing system, a target class kernel and a distractor class kernel using ground truth bounding boxes;
creating, by the computing system, an object-distractor difference kernel that represents a normalized difference between the target class kernel and the distractor class kernel; and
processing each layer, by the computing system, using an ODD kernel, wherein
the processing is performed in real time.

7. The computer-implemented method of claim 1, further comprising:
outputting rasterized images, by the computing system, for color/texture analysis, shape/contour analysis, and/or motion analysis, wherein pixel values for the one or more rasterized images represent different categories or levels of activation; and
combining the rasterized images, by the computing system, into a coherent and intelligible output utilizing a spatially aware combination method or representing each rasterized image as a neuronal activity file that can be combined within the hierarchical network itself.

8. The computer-implemented method of claim 1, further comprising:
representing each classifier of a plurality of classifiers, by the computing system, as a binary detector comprising logical binary images.

9. The computer-implemented method of claim 8, further comprising:
deriving hit rate and false alarm values, by the computing system, on a pixel level, wherein pixels inside a ground-truth box are considered to be an object and pixels outside the ground-truth box are considered not to be the object.

10. The computer-implemented method of claim 9, further comprising:
computing Boolean combination rules, by the computing system, and determining an optimal Boolean combination rule;
combining outputs of the classifiers, by the computing system, based on the computed optimal Boolean combination rule;
clustering hits, by the computing system, using a spatial clustering algorithm; and
outputting, by the computing system, bounding box locations, labels, and label confidences based on the clustered hits.

11. The computer-implemented method of claim 1, further comprising:
learning pixel-based dictionaries, by the computing system, from reconstructed images generated by a sparse set of features that are active in the previous layer in response to a given image or video frame.

12. The computer-implemented method of claim 1, wherein the image or video comprises satellite image or video, one or more regional-scale satellite imagery collections for monitoring change over time of geographic or man-made features, multi-spectral satellite imagery, or any combination thereof.

13. The computer-implemented method of claim 12, further comprising:
down-sampling a reconstructed image generated by the sparse set of features with non-zero activity, by the computing system, so that a required size of the pixel-based dictionaries remains constant at each layer of the plurality of computational layers in the hierarchical network.

14. A computer program embodied on a non-transitory computer-readable medium, the program configured to cause at least one processor to:
produce a hierarchical network of a plurality of computational layers for color/texture analysis of an image or video, shape/contour analysis of the image or video, motion analysis of the image or video, or any combination thereof, the image or video comprising satellite image or video, one or more regional-scale satellite imagery collections for monitoring change over time of geographic or man-made features, multi-spectral satellite imagery, or any combination thereof;
create vertical competition between the plurality of computational layers by including top-down feedback from subsequent layers to previous layers;
create lateral competition among invariant feature detectors in each computational layer by receiving and processing spatially convergent lateral input from a surrounding neighborhood of selective feature detectors in the respective layer; and
generate cortical representations at each hierarchical layer incorporating the top-down feedback to reduce redundancy and increase sparseness of the generated cortical representations.

15. The computer program of claim 14, the program configured to cause the at least one processor to:
employ pixel-based dictionaries, by the computing system, to guide acquisition of the feature-based dictionaries by training a first layer of dictionary elements on image patches and training subsequent layers on a combination of direct feature-based inputs and down-sampled, pixel-based inputs arising from images generated by sparsely activated features of a previous layer; and combine the pixel-based and feature-based dictionaries to reduce effective dimensionality of feature-based inputs, augmenting learning of the feature-based dictionaries.

16. The computer program of claim 14, the program further configured to cause the at least one processor to:

subdivide the plurality of computational layers into a first stage of selective feature detectors and a second stage of invariant feature detectors that are implemented by combining local and lateral dictionaries; and create lateral competition among invariant feature detectors in a given layer by receiving and processing spatially convergent lateral input from a surrounding neighborhood of the selective feature detectors in the layer, resulting in interlayer invariance to linear and non-linear transformations while maintaining scalability, wherein the selective feature detectors form a first stage of processing within each layer of the plurality of computational layers, and the invariant feature detectors form a second stage of processing within each layer of the plurality of computational layers.

17. The computer program of claim 14, the program further configured to cause the at least one processor to:

represent each classifier of a plurality of classifiers as a binary detector comprising logical binary images;

derive hit rate and false alarm values on a pixel level, wherein pixels inside a ground-truth box are considered to be an object and pixels outside the ground-truth box are considered not to be the object;

compute Boolean combination rules and determine an optimal Boolean combination rule;

combine outputs of the classifiers based on the computed optimal Boolean combination rule;

cluster hits using a spatial clustering algorithm; and output bounding box locations, labels, and label confidences based on the clustered hits.

18. An apparatus, comprising:
memory storing computer program instructions; and
at least one processor configured to execute the computer program instructions, the at least one processor configured to:

create vertical competition between a plurality of computational layers of a hierarchical network by including top-down feedback from subsequent layers to previous layers, train a target class kernel and a distractor class kernel using ground truth bounding boxes, create an object-distractor difference kernel that represents a normalized difference between the target class kernel and the distractor class kernel, and process each layer using an ODD kernel, wherein
the processing is performed in real time.

19. The apparatus of claim 18, wherein the at least one processor is further configured to:

employ pixel-based dictionaries, by the computing system, to guide acquisition of the feature-based dictionaries by training a first layer of dictionary elements on image patches and training subsequent layers on a combination of direct feature-based inputs and down-sampled, pixel-based inputs arising from images generated by sparsely activated features of a previous layer;

combine the pixel-based and feature-based dictionaries to reduce effective dimensionality of feature-based inputs, augmenting learning of the feature-based dictionaries;

subdivide the plurality of computational layers into a first stage of selective feature detectors and a second stage of invariant feature detectors that are implemented by combining local and lateral dictionaries; and create lateral competition among invariant feature detectors in a given layer by receiving and processing spatially convergent lateral input from a surrounding neighborhood of the selective feature detectors in the layer, resulting in interlayer invariance to linear and non-linear transformations while maintaining scalability.

* * * * *